(12) United States Patent
Benaloh

(10) Patent No.: US 7,613,302 B2
(45) Date of Patent: *Nov. 3, 2009

(54) SYSTEMS AND METHODS FOR COMPRESSION OF KEY SETS HAVING MULTIPLE KEYS

(75) Inventor: Josh D. Benaloh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/016,458

(22) Filed: Dec. 17, 2004

(65) Prior Publication Data

US 2005/0117746 A1    Jun. 2, 2005

Related U.S. Application Data

(63) Continuation of application No. 09/638,041, filed on Aug. 12, 2000, now Pat. No. 6,886,098.

(60) Provisional application No. 60/149,107, filed on Aug. 13, 1999.

(51) Int. Cl.
*H04L 9/00* (2006.01)
*H04N 7/167* (2006.01)

(52) U.S. Cl. .......................... 380/277; 380/30; 380/46; 380/239; 713/150; 713/166; 713/193

(58) Field of Classification Search ................. 713/150, 713/166, 193; 380/30, 46, 239, 277
See application file for complete search history.

(56) References Cited

U.S. PATENT DOCUMENTS 3,657,476 A * 4/1972 Aiken ........................ 713/190

(Continued)

FOREIGN PATENT DOCUMENTS

EP    0978839    2/2000

(Continued)

OTHER PUBLICATIONS

Press Pass "Xbox to Deliver Ultimate Console Gaming Experiences" San Jose Ca Mar. 10, 2000 3 pages 2001.

*Primary Examiner*—Gilberto Barron, Jr.
*Assistant Examiner*—A. Nobahar
(74) *Attorney, Agent, or Firm*—Lee & Hayes, PLLC

(57) ABSTRACT

Systems, methods and modulated data signals are described herein that provide an efficient way to derive a single key from which a user can extract virtually any number of data encryption keys. A database is logically divided into segments and a small prime number is associated with each segment. An encryption key is derived for each segment in the database and a key set is determined for distributing a data subset to a user. Each segment is encrypted with the corresponding encryption key. A single key is derived using the prime numbers associated with the data segments and the single key, the encrypted database, and a small amount of public information is provided to the user. The user utilizes this information to extract the encryption key set from the single key. One implementation utilizes a tree structure to significantly reduce the number of modular exponentiations that must be calculated when extracting the encryption keys. This, in turn, dramatically decreases the processing overhead that must be allocated to the processing associated with deriving the encryption keys.

8 Claims, 17 Drawing Sheets

U.S. PATENT DOCUMENTS

| | | | |
|---|---|---|---|
| 4,864,615 A | 9/1989 | Bennett et al. | |
| 5,008,935 A | 4/1991 | Roberts | |
| 5,201,000 A | 4/1993 | Matyas et al. | |
| 5,295,188 A * | 3/1994 | Wilson et al. | 380/30 |
| 5,319,705 A | 6/1994 | Halter et al. | |
| 5,438,622 A | 8/1995 | Normile et al. | |
| 5,481,610 A | 1/1996 | Doiron et al. | |
| 5,548,648 A | 8/1996 | Yorke-Smith | |
| 5,615,264 A | 3/1997 | Kazmierczak et al. | |
| 5,675,649 A | 10/1997 | Brennan et al. | |
| 5,701,343 A | 12/1997 | Takashima et al. | |
| 5,708,714 A | 1/1998 | Lopez et al. | |
| 5,754,649 A | 5/1998 | Ryan et al. | |
| 5,809,139 A | 9/1998 | Girod et al. | |
| 5,870,474 A | 2/1999 | Wasilewski et al. | |
| 5,915,018 A | 6/1999 | Aucsmith | |
| 5,915,027 A | 6/1999 | Cox et al. | |
| 5,923,754 A | 7/1999 | Angelo et al. | |
| 5,937,066 A | 8/1999 | Gennaro et al. | |
| RE36,310 E | 9/1999 | Bjerrum et al. | |
| 6,052,466 A | 4/2000 | Wright | |
| 6,182,216 B1 | 1/2001 | Luyster | |
| 6,195,751 B1 | 2/2001 | Caronni et al. | |
| 6,226,618 B1 | 5/2001 | Downs et al. | |
| 6,259,789 B1 | 7/2001 | Paone | |
| 6,347,145 B2 | 2/2002 | Kato et al. | |
| 6,424,717 B1 | 7/2002 | Pinder et al. | |
| 6,550,008 B1 | 4/2003 | Zhang et al. | |
| 6,556,679 B1 | 4/2003 | Kato et al. | |
| 6,598,161 B1 | 7/2003 | Kluttz et al. | |
| 6,697,488 B1 | 2/2004 | Cramer et al. | |
| 2002/0007454 A1 | 1/2002 | Tarpenning et al. | |

FOREIGN PATENT DOCUMENTS

| | | |
|---|---|---|
| WO | WO 00/21239 | 1/1900 |
| WO | WO99/12310 | 3/1999 |
| WO | WO 00/31744 | 6/2000 |
| WO | WO01/13571 | 2/2001 |

* cited by examiner

SYSTEMS AND METHODS FOR COMPRESSION OF KEY SETS HAVING MULTIPLE KEYS

RELATED APPLICATIONS

This application stems from and claims priority to U.S. Provisional Application Ser. No. 60/149,107, filed on Aug. 13, 1999, the disclosure of which is incorporated by reference herein. This application is a continuation of U.S. patent application Ser. No. 09/638,041, filed Aug. 12, 2000, now U.S. Pat. No. 6,886,098, the disclosure of which is incorporated by reference herein.

TECHNICAL FIELD

The systems and methods described herein relate to compression, distribution and decompression of cryptographic keys. More particularly, the described implementations relate to compression, distribution and decompression of key sets having multiple cryptographic keys.

BACKGROUND

There are systems in which it is desirable to distribute a large database or other information set to multiple users, each user to have access to different subsets of the data. Besides databases, such systems include pay-per-view broadcasts in which each customer has purchased viewing rights to a different set of programs, in-flight entertainment systems, and fingerprinting methodologies wherein multiple copies of each content clip are produced and each recipient is given access to exactly one of the copies of each clip.

One method to enable each user to access the data to which the user is entitled is to separately encrypt each datum and distribute to the user only the keys to the exact subset of data to which the user is entitled. Thus, the problem of distributing different data sets is reduced to the problem of distributing different key sets, each key set being a subset of a universe of keys.

If the universe of keys is large, then the subsets of keys that must be customized and separately sent to each individual user may be large. This can impose substantial burdens on the distribution system.

For example, suppose that each of m customers in a cable television system, on which k pay-per-view shows are to be aired over a given period, is to be given some subset of k keys. If each customer, on average, obtains rights to r of these k shows, then conventional methods would require that a total of mr keys be distributed. There is a point where the number of customers can be so large as to make distribution of the total number (mr) of keys impractical.

SUMMARY

Methods and systems are described herein that allow an encrypted database and a single key to be given to each of multiple users so that each user can access a subset of the database to which the user is entitled. The single key given to each user may be different from each single key provided to each of the other users. From the single key received by each user and a small amount of shared public information, each user can generate the entire set of keys—and only those keys—to which the user is entitled.

In the example given above for the customers in a cable television system, the implementations described herein allow the total number of keys distributed to be reduced to m. This makes a significant difference if the distribution is to take place over a limited medium such as a cable or a single (same for everyone) CD or DVD.

In addition, the implementations describe a mechanism whereby each set of keys can be compressed into a single key whose size is dependent only on a security parameter. For example, the number of distinct keys that can be compressed into a 1024-bit value is limited only by the number of distinct primes less than $2^{1024}$ (said number being in excess of $2^{1014}$).

A small odd prime integer ($p_i$) is associated with each datum to be protected. No prime is associated with more than one datum, and the set of these primes and their association is completely public. The owner of the data selects two large prime integers and forms their product (N). The owner of the data also selects a random base integer value (x). A reference value (y) may then be formed as the random base integer value (x) raised modulo N to the power of the product of all small primes associated with the data. This reference value (y) can be made public.

The content key used to encrypt each datum to be secured is a fixed function—such as a cryptographic hash—of the $p^{th}$ root modulo N of the reference integer value (y), where p is the small odd prime integer.

In one or more implementation described herein, the content key is alternatively derived by raising x to the power, modulo N, of the products of all primes to which the user is entitled except for the prime associated with the datum associated with the content key. In other implementations, the reference value (y) is used instead of the base integer value (x), and content keys are computed as roots of (y) rather than powers of (x).

Each user is then given x to the power, modulo N, of the product of all primes which are associated with data to which the user is not entitled. From this single value, a user can easily compute the content key for all data to which the user is entitled. However, a user cannot obtain any content keys corresponding to data to which the user is not entitled. Furthermore, no group of users can conspire to obtain access to any content keys to which none of the participants have individual access.

In another implementation, a tree structure is created and utilized to decrease the number of modular exponentiations that must be calculated to derive the content keys. This significantly reduces the amount of processor time that must be allocated for such operations.

BRIEF DESCRIPTION OF THE DRAWINGS

A more complete understanding of exemplary methods and arrangements of the present invention may be had by reference to the following detailed description when taken in conjunction with the accompanying drawings wherein.

DETAILED DESCRIPTION

The following description sets forth specific embodiments that incorporate elements recited in the appended claims. The embodiments are described with specificity in order to meet statutory requirements. However, the description itself is not intended to limit the scope of this patent. Rather, the inventors have contemplated that the claimed invention might also be embodied in other ways, to include different elements or combinations of elements similar to the ones described in this document, in conjunction with other present or future technologies.

Exemplary Operating Environment

The inventive principles described below can be employed in connection with any database to which an owner of the database wishes to allow multiple users access to different data subsets of the database. For purposes of discussion, the implementations will be described within the context of a multi-media distribution system and, in particular, a suitable digital content player.

The implementations may be employed in connection with any suitable digital content player. One exemplary digital content player is a DVD player that is utilized in an example throughout this document. It is to be understood, however, that the illustrated DVD player constitutes but one exemplary type of digital content player.

Figure 1:
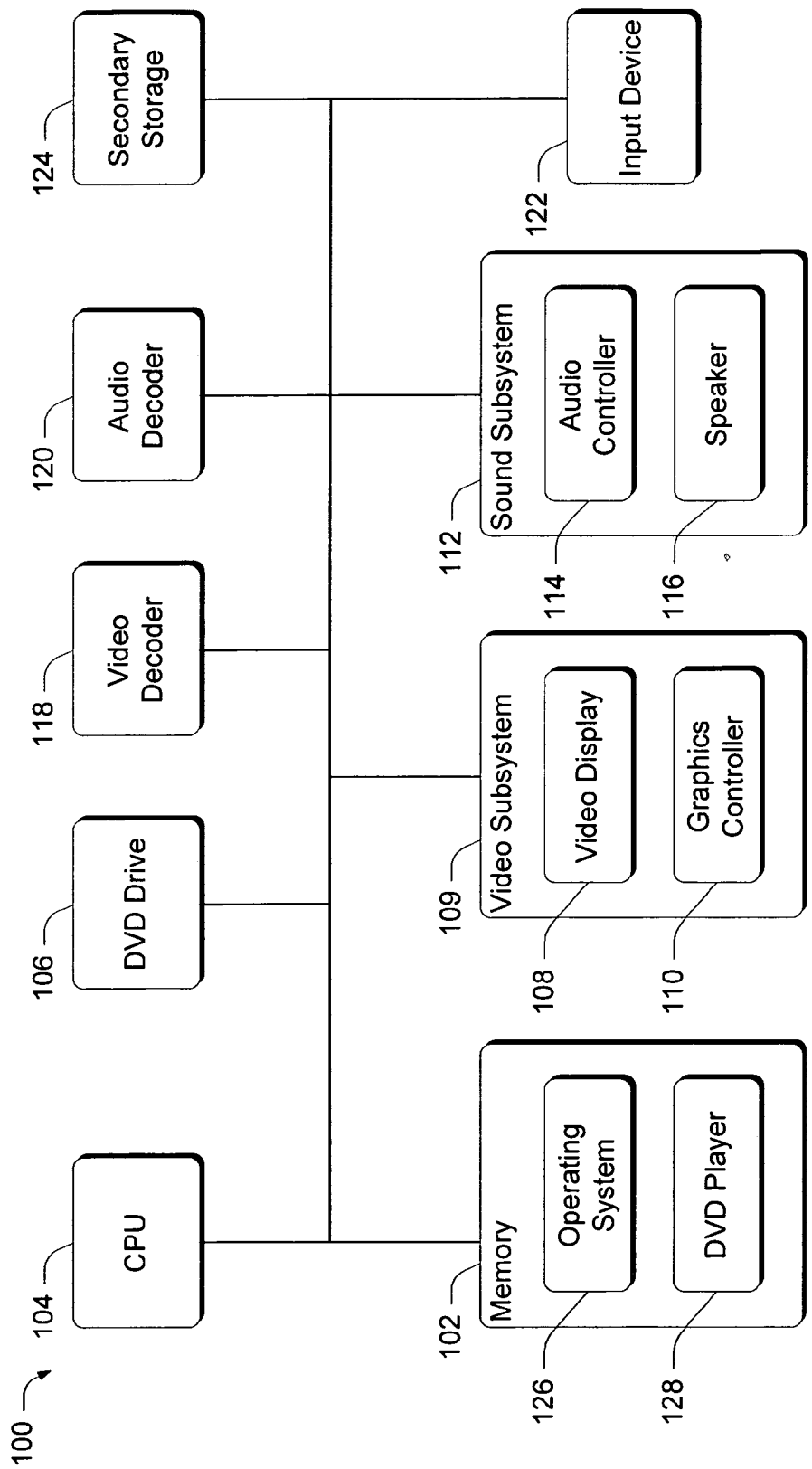
FIG. 1 is a block diagram of an exemplary content player that is suitable for use in connection with the described embodiments.

FIG. 1 depicts an exemplary DVD content player 100 that is suitable for practicing the described embodiments. The content player 100 contains a memory 102; a central processing unit (CPU) 104; a video subsystem 109, including a video display 108 and a graphics controller 110; a sound subsystem 112, including both an audio controller 114 and a speaker 116; a DVD drive 106; a video decoder 118; an audio decoder 120; an input device 122; and a secondary storage device 124. The memory 102 contains an operating system 126, such as the MICROSOFT.RTM. WINDOWS.RTM. 95 operating system available from Microsoft Corporation of Redmond, Wash., and a DVD player program 128. The DVD player program 128 is responsible for reading an audio-visual stream from the DVD drive 106, decoding the audio-visual stream using the audio decoder 120 and the video decoder 118, and rendering both the audio and video portions of the audio-visual stream on the sound subsystem 112 and the video display 108, respectively, such that the video portion of the audio-visual stream is synchronized with the graphics controller 110.

The graphics controller 110 controls operations of the video display 108. The graphics controller 110 stores video data to be displayed on the video display 108 and instructs the video display to display the stored video data. In order to store the video data, the graphics controller 110 has a limited amount of dynamic random access memory that it uses.

Both the audio decoder 120 and the video decoder 118 can be implemented as hardware circuits using conventional techniques for decoding the audio or video data, like MPEG 1, MPEG 2, or AC3. One skilled in the art will appreciate that the audio decoder 120 and the video decoder 118 can also be implemented in software. One skilled in the art will recognize that the video decoder 118, although depicted separately from the graphics controller 110, can be implemented as part of the graphics controller.

As previously stated, the DVD player 128 reads the audio-visual stream from the DVD drive 106 and renders the audio-visual stream using the video subsystem 109 and the sound subsystem 112. The DVD player 128 operates as an application program running on the operating system 126, and utilizes the operating system to access the DVD drive 106. Specifically, the DVD player 128 reads the audiovisual stream by requesting the operating system 126 to open a file on the DVD drive 106 that contains the audio-visual stream and by reading the stream from the DVD drive using normal file system calls of the operating system.

Generally, the CPU 104 of system 100 is programmed by means of instructions stored at different times in the various computer-readable storage media of the system. Programs and operating systems can typically be distributed, for the illustrated system, on DVDs. From there, they are installed or loaded into the secondary memory or storage of the system. At execution, they are loaded at least partially into the system's primary electronic memory. The invention described herein includes these and other various types of computer-readable storage media when such media contain instructions or programs for implementing the steps described below in conjunction with a microprocessor or other data processor. The invention also includes the system itself when programmed according to the methods and techniques described below. For purposes of illustration, programs and other executable program components such as the operating system are illustrated herein as discrete blocks, although it is recognized that such programs and components reside at various times in different storage components of the computer, and are executed by the CPU of the system.

The additional specifics of the operation of a DVD content player are understood by those of skill in the art and are not explored in any additional detail here.

Exemplary Embodiment

Figure 2:
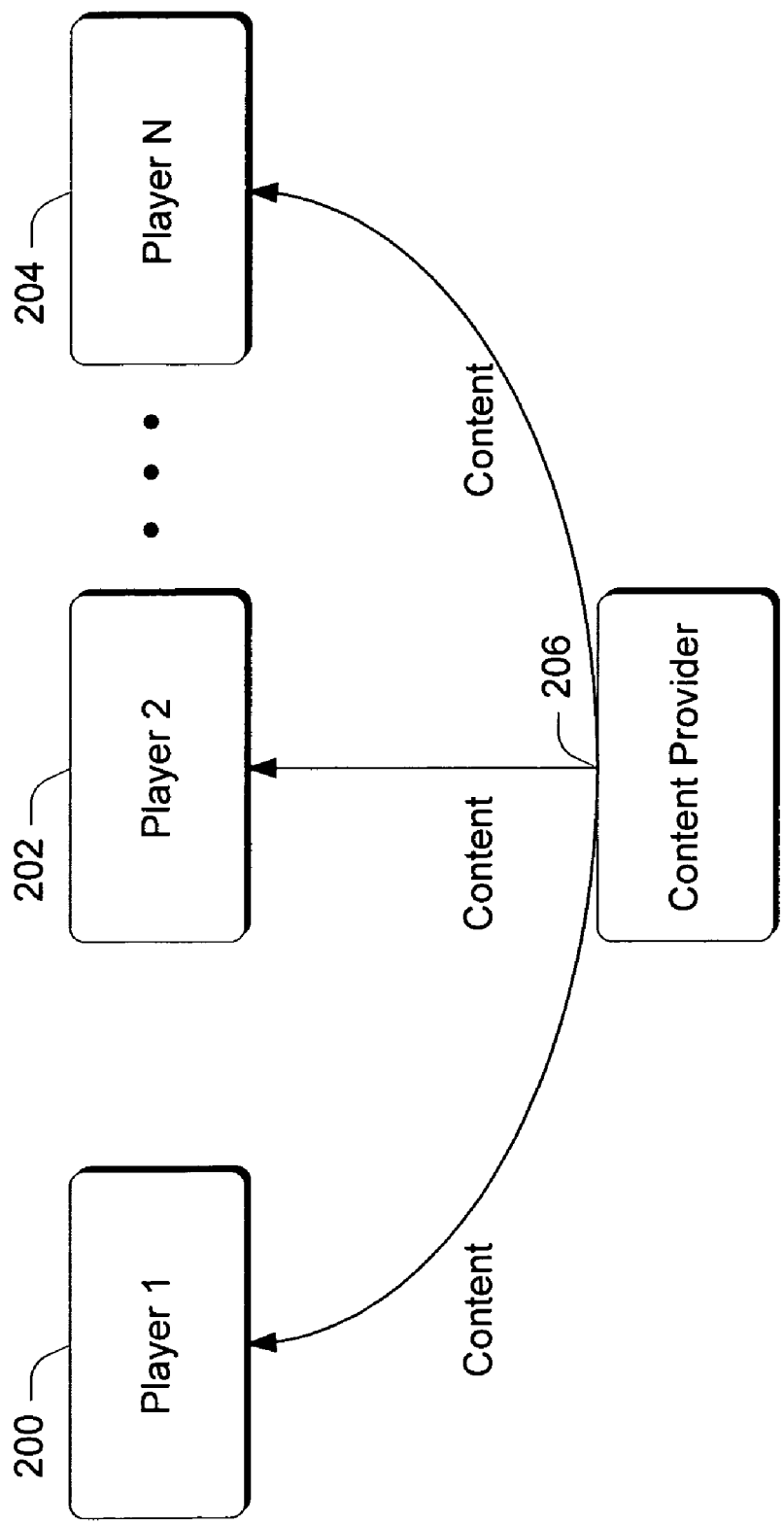
FIG. 2 is a high-level block diagram of an exemplary operating environment in which the described embodiments can be practiced.

FIG. 2 illustrates but one exemplary environment in which the inventive techniques described below can be employed. It is to be appreciated that the illustrated and described environment is for exemplary purposes only, and to assist the reader in understanding, more tangibly, how the described inventive principles can be employed.

The FIG. 2 system comprises a system in which there are a limited or predetermined number of digital content players 200, 202, 204. In this example, the digital content players are labeled as "Player 1", "Player 2", and "Player N". As indicated above, the content players can comprise any suitable player that is capable of playing any type of digital content that is embodied on a readable medium. For purposes of this specific example, however, the content players can comprise DVD players, such as the one shown in FIG. 1, that are configured to play movies that are embodied on DVD discs. One exemplary environment in which such DVD players can be used—where there are a limited number of players—is the in-flight entertainment environment. Specifically, such content players are typically installed, semi-permanently, in commercial airliners so that airline passengers can enjoy in-flight movies. These in-flight movies are provided on DVD disks. Like other sources of digital content, these DVD disks can be subject to acts of commercial piracy. This is especially so because the DVD disks typically contain feature films that are still in limited release. FIG. 2 also shows a content provider 206 that provides content to the content players. The content provider 206 can be any suitable content provider such as the owner of the digital content. In the in-flight entertainment example, an exemplary content provider would be the owner or distributor of in-flight movies embodied on DVDs.

In designing systems for operation in an environment where digital content will likely come under attack, it is desirable to move in a direction away from specialized hardware solutions. That is, in the past, special tamper-resistant hardware has been used in an attempt to protect digital content. This hardware is typically installed in a player and is directed to ensuring that it protects its digital content. Specialized hardware solutions are not ideal because they provide a motivation for hardware theft. Additionally, commercial pirates, being of a sophisticated nature, can generally design their own specialized hardware solutions that play back pirated content. Thus, if one is to move away from specialized hardware solutions, the natural direction is a software solution.

One past software solution that is less than ideal is to specially mark each digital content copy, i.e. movie, with its own unique identifier and to associate the marked copy with a particular airline or airplane. If or when a marked movie is copied, the identifier can be identified through analysis, and then easily traced back to the airline that "leaked" the movie. Currently, there is a push away from such serialization techniques because of the economics involved. Specifically, serially marking each copy of a movie is an undesirably expensive process. Yet, there remains a desire to preserve as much traceability and trackability as possible.

Thus, in the FIG. 2 system, the ideal system would be one in which each of the content players is identical in design, and devoid of specialized hardware. In addition, it would be ideal for the digital content that is distributed to each of the players to be identical. In this way, the economics of producing copies of the digital content are not adversely impacted.

One premise of the inventive design described below is that if a content player is a good or valid player, then any disc containing the digital content inserted into the player will play. If the disc containing the digital content is inserted into a bad or invalid player (such as a pirate's player), it will not play. Additionally, if the digital content on the disc is stolen, it should be traceable to the content player from which it came.

The techniques discussed below provide a way to take a single piece of encrypted content and have multiple different keys to decrypt the content such that, when the different keys are utilized to decrypt the content, the decrypted versions of the content will indicate which key, and hence, the content player from which it came. One aspect of these techniques is that a single consumer is required to possess many different keys to decrypt the content. These multiple keys must be transmitted to the customer. If the number of keys required is small, e.g., eight keys, such transmission of the keys is not prohibitively expensive. However, if the number of keys is large, e.g., several hundred, transmitting the keys to the consumer may be very expensive, in terms of resource overhead.

The inventive principles outlined below define implementations in which multiple keys can be "compressed" into a single key. The same encrypted content is transmitted to each consumer (or content player). Each consumer also receives a private key that the consumer can manipulate (with some public information) to derive a set of multiple keys that can be used to access the portions of the content to which the consumer is entitled.

Exemplary Content Player

Figure 3:
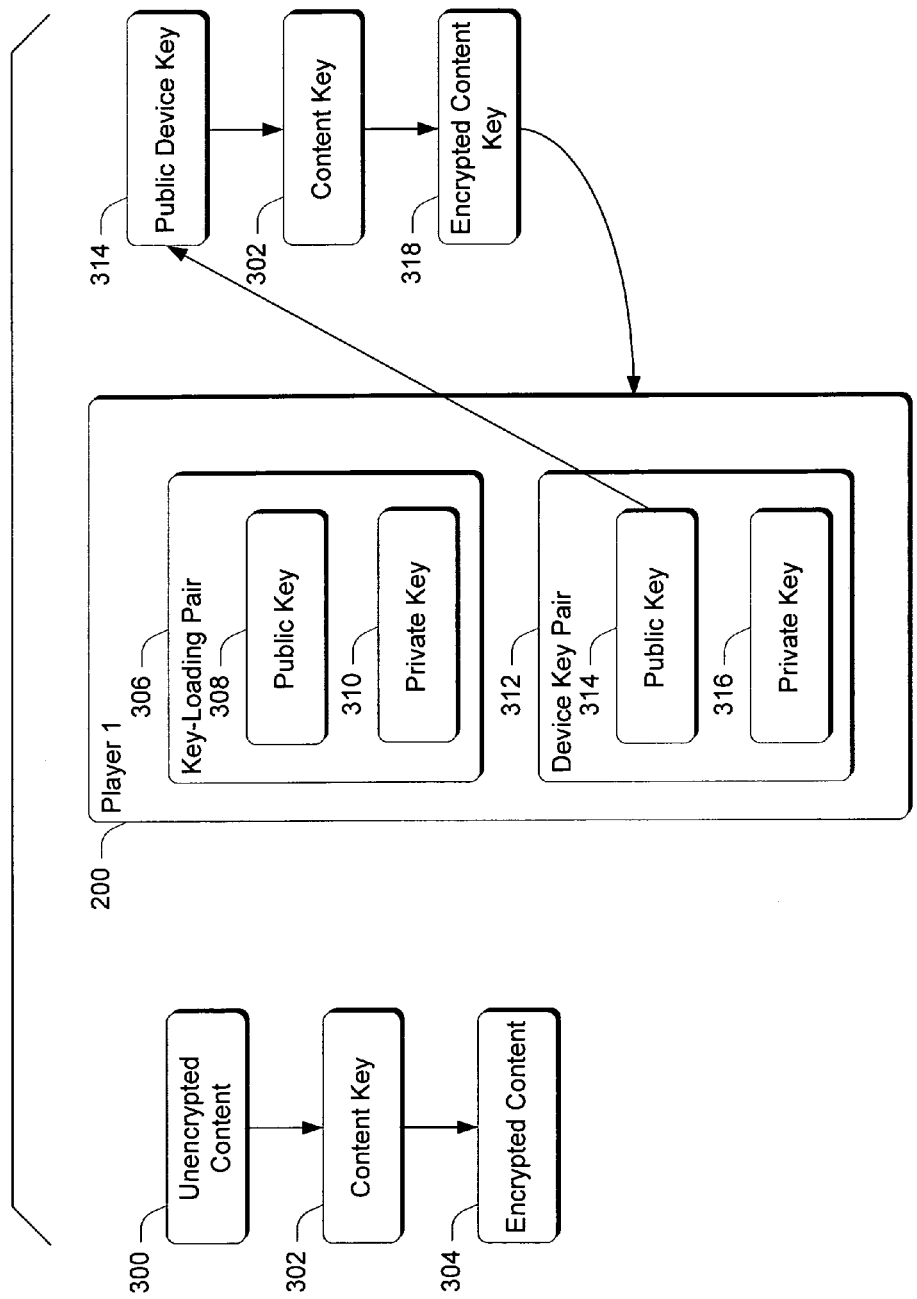
FIG. 3 is a block diagram showing an exemplary content player that can be utilized in connection with the described embodiments.

FIG. 3 shows content player 200 in somewhat more detail, along with other components that comprise an exemplary inventive system. Specifically, unencrypted content 300 is provided and constitutes any suitable type of digital content that is to be protected. In this particular example, content 300 comprises a movie that resides on a DVD and is to be used for in-flight entertainment. A content key 302 is provided and is used to encrypt all of the digital content on the DVD to provide encrypted content 304. The content key can be any suitable content key, as will be appreciated and understood by those of skill in the art. In the illustrated example, the content key is a symmetric cryptographic key. The content key encryption is typically carried out by the manufacturer of the DVD that carries the encrypted movie.

Now, if player 200 possesses the content key 302 then it can use the content key to decrypt and play the encrypted movie. If player 200 does not possess the content key, then it cannot decrypt and play the movie.

The following discussion illustrates but one exemplary way of securely providing the content players with the encrypted content key 302.

In the illustrated and described embodiment, player 200 is provided with two pairs of public/private keys. A key-loading pair 306 includes a public key 308 and a private key 310. A device key pair 312 includes a public key 314 and a private key 316. It is possible, however, for the players to have only a device key pair, as will become apparent below.

Every content player is configured to generate its own unique key-loading pair 306. The player maintains and protects the key-loading private key 310 and provides the key-loading public key 308 to an entity whose responsibility it is to assign device key pairs. This entity might, for example, comprise the manufacturer of the content player. This entity maintains a list of content player serial numbers and their corresponding key-loading public keys. The manufacture also maintains a list of device key pairs that are to be used by the individual content players. The manufacturer uses the public key 308 of the key-loading pair 306 to encrypt the private key 316 of the device key pair 312. The encrypted private key 316 is then securely transferred to the content player. At this point, the content player can use the private key 310 of the key-loading pair 306 to decrypt the private key 316 of the device key pair 312. Note that the above discussion pertains to a system in which the device key pairs are externally generated by an entity such as a manufacturer. It is possible for the players to generate their own device key pairs after they are manufactured and export their public device key to the manufacturer. This latter scenario would be the more secure of the two insofar as it reduces the possibility that a private device key might be compromised. Using a key-loading pair, however, makes it possible for subsequent device keys to be provided to the content player if, for example, the content player must be removed and serviced. In that case, the device keys for the content player would need to be erased to prevent compromise. Of course, it is possible for the content player to regenerate a new device key pair.

Accordingly, at this point, each content player has a device key pair, such as key pair 312, regardless of the way such pair came into being. The public device key 314 is then used, as indicated in the rightmost portion of the figure, to encrypt the content key 302 to provide an encrypted content key 318. The encrypted content key can then be provided to the player 200 and decrypted using the player's private device key 316. The player can now use the content key to decrypt the encrypted content 304.

Thus, the above discussion illustrates but one way of securely providing a content key to a content player so that the content player can use the content key to decrypt encrypted content. In the illustrated scenario of in-flight entertainment systems, the content players are essentially self-contained so that there are no additional communication lines into or out of the content player. With no additional communication lines, there must be some way of providing the encrypted content key to the player.

Figure 4:
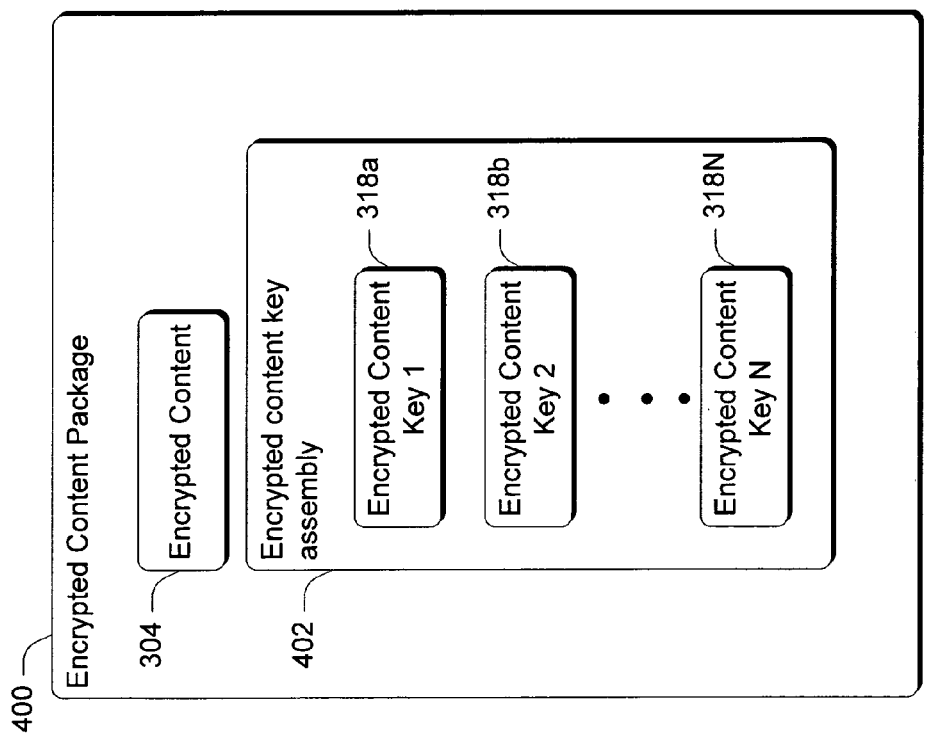
FIG. 4 is a block diagram that describes an exemplary encrypted content package that can be utilized in connection with the described embodiments.

FIG. 4 shows an exemplary solution to this situation in the form of an encrypted content package 400, which includes the encrypted content 304 (which, in this example, is the encrypted movie) and a so-called encrypted content key assembly 402. Both the encrypted content 304 and the encrypted content key assembly 402 are provided on the DVD. The encrypted content key assembly 402 contains multiple encrypted content keys 318a-n—one for each valid content player. So, in this example where there are 1 through N content players, the encrypted content key assembly contains an encrypted content key for each content player.

Figure 5:
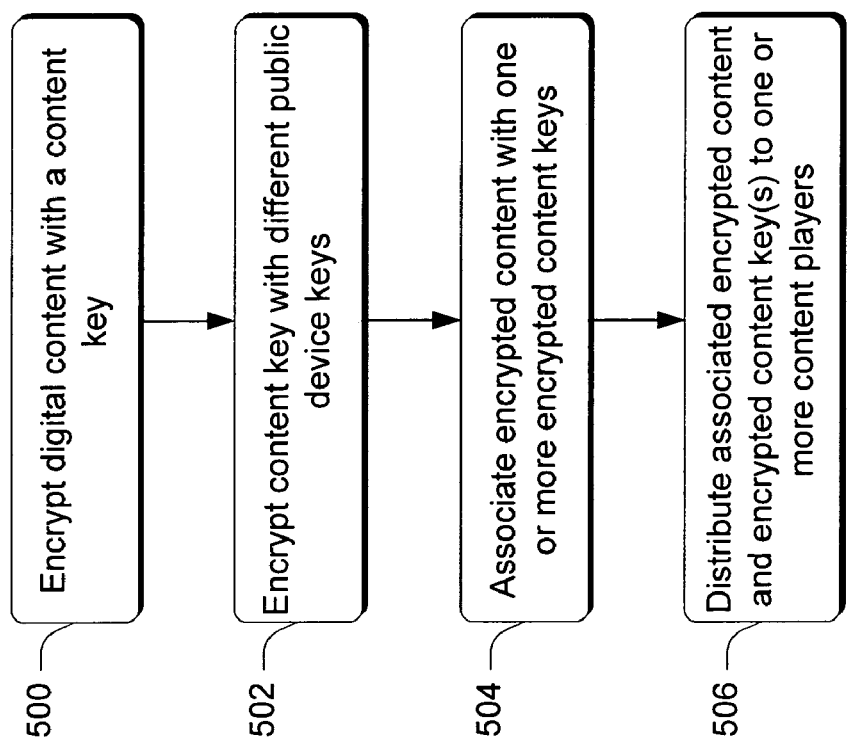
FIG. 5 is a flow diagram that describes steps in a method in accordance with the described embodiments.

FIG. 5 is a flow diagram that describes a method of associating encrypted content with a content key that was utilized to encrypt the content. Step 500 encrypts digital content with one or more content keys. Any suitable content key can be used. Step 502 encrypts the content keys with different public device keys. This provides multiple differently encrypted content keys. Step 504 associates the encrypted digital content with one or more of the encrypted content keys. In the above example, this association is embodied in an encrypted content package 400. Step 506 distributes the associated encrypted content and encrypted content keys to one or more content players. In the above example, distribution takes place by embodying the encrypted content package 400 on a DVD and distributing the DVD to suitable content players.

Figure 6:
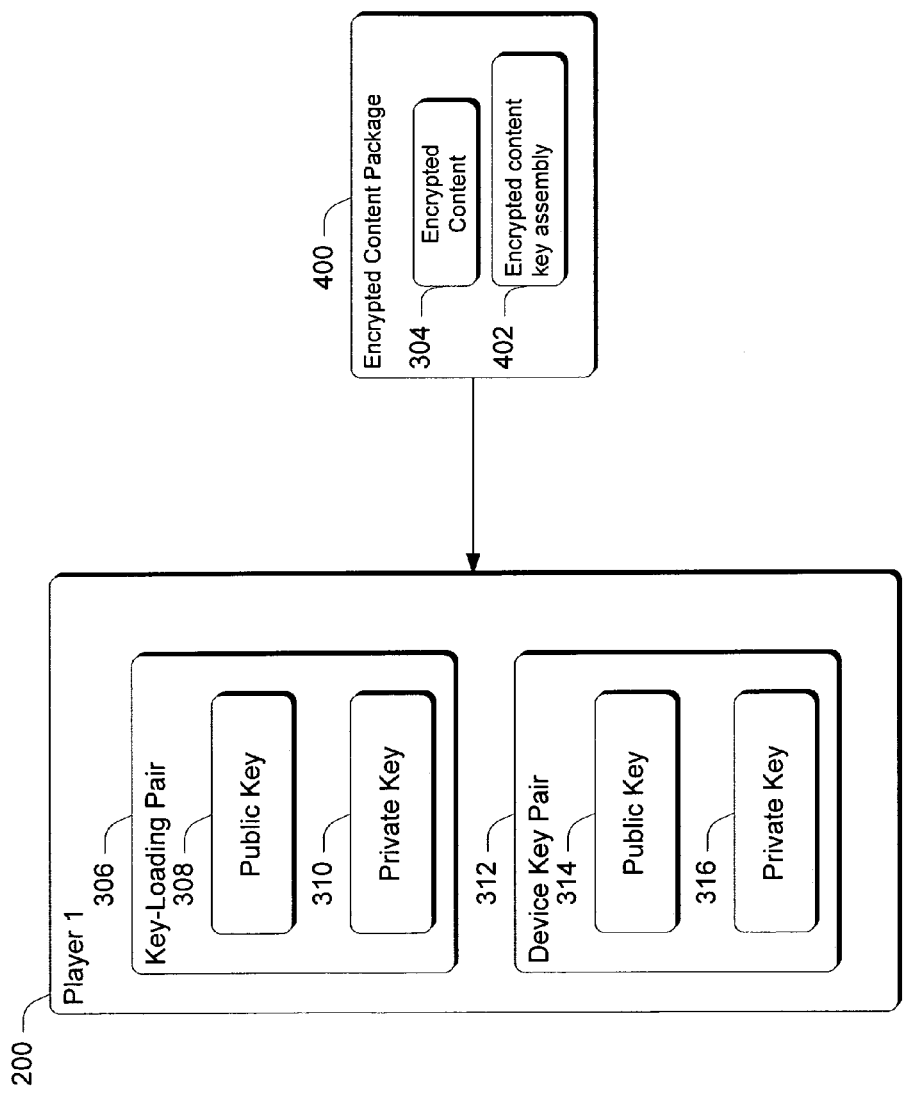
FIG. 6 is a block diagram that depicts the FIG. 3 content player and the FIG. 4 encrypted content package.

With the encrypted content package having been formed, it can now be provided to the various content players, as indicated by FIG. 6. In this example, the encrypted content package 400 is provided to a particular player by inserting a DVD embodying the encrypted content 304 and encrypted content key assembly 402 into the content player. The player is configured to find the content key(s) that have been encrypted with its public device key 314 (FIG. 3), decrypt the encrypted content key(s) using its private device key, and then decrypt the encrypted content 304 using the content key(s) so that the content or movie (in this example) can be displayed. Thus, only authorized content players are able to access the encrypted content key(s) to decrypt the movie. Any unauthorized content player will not be able to decrypt the encrypted content.

Figure 7:
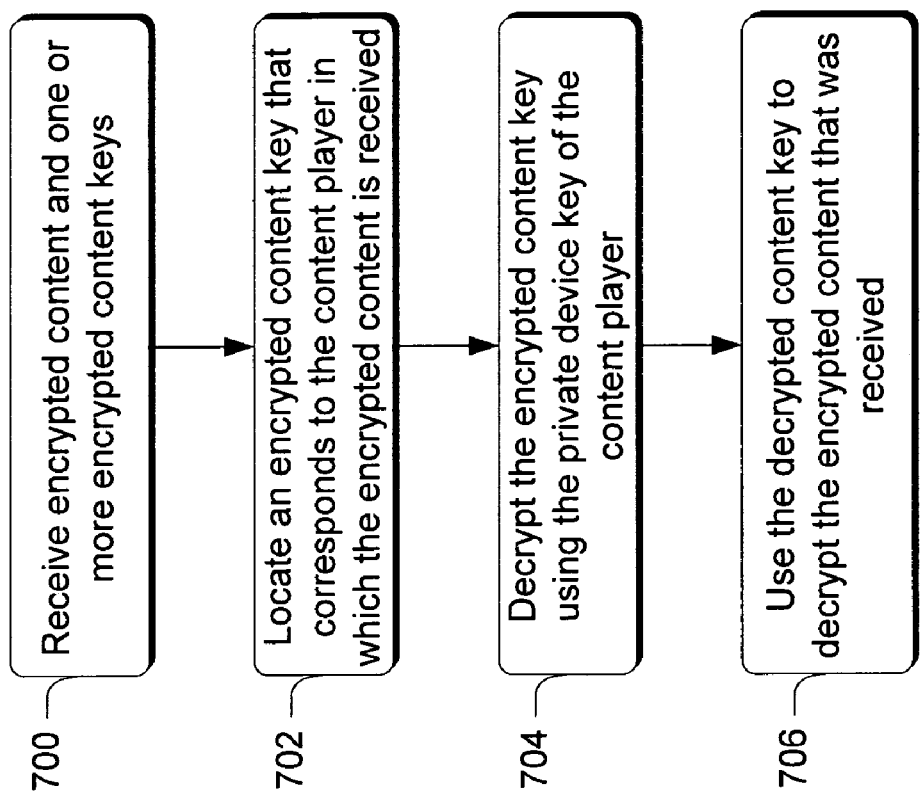
FIG. 7 is a flow diagram that describes steps in a method in accordance with the described embodiments.

FIG. 7 is a flow diagram that describes a method of accessing encrypted content. The method can be implemented in any suitable hardware, computer implemented software, firmware or combination thereof. In the illustrated in-flight entertainment example, the method is implemented by a content player.

Step 700 receives encrypted content and one or more encrypted content keys. In the illustrated example, the encrypted content and content key(s) are embodied as an encrypted content package on a common medium in the form of a DVD. Advantageously, in this example, multiple differentially encrypted content keys are provided in the form of an encrypted content key assembly, such as assembly 402 in FIG. 400. The content keys are desirably encrypted using the public device key for each of the players to which the encrypted content is distributed. It is possible, however, for the encrypted content and the encrypted content key to be separately received by a content player. For example, a content player might comprise a set-top box that first receives the encrypted content key(s), and then receives the encrypted content. Step 702 locates the encrypted content key(s) that corresponds to the content player in which the encrypted content is received. Step 704 decrypts the encrypted content key(s) using the private device key of the content player. Step 706 then uses the decrypted content key(s) to decrypt the encrypted content that was received.

This approach works especially well in environments where there are only a limited number of content players. The approach provides a secure, self-contained package that can only be opened by authorized content players. One of the problems with the above system, however, is that if the content is valuable enough, a pirate could conceivably steal or otherwise access a content player to get to the encrypted content package. The pirate could then conceivably access the encrypted content 304 in much the same way as the player would. Accordingly, what is needed and desirable is a system similar to the one described above, but in which any unauthorized copies of digital content are directly traceable to the particular content player, or more specifically, the particular content key(s) that were used to access the digital content.

Exemplary Differential Decryption System and Method

Digital fingerprinting is commonly desired to offer some protection for digital content. Traditionally, when intellectual property such as films, songs, or even software is illegally copied and resold, there is little if any ability to trace the source of the leak. Individually fingerprinting each legitimately distributed copy offers some measure of protection, but also presents a large burden. The approach about to be described drastically reduces this burden, regardless of the fingerprinting system used.

The embodiment about to be described carries with it some advantages of which the inventors are unaware in other protection schemes. First, even if a content player is stolen or otherwise compromised and the content decrypted with its associated content key(s), the decrypted content itself inherently indicates the source of the content. Thus, if and when illegal copies are made, the source of the content is readily identifiable. Second, the overall system is dynamic in the sense that it is not dependent on any one fingerprinting technology. That is, as fingerprinting technology continues to evolve, new techniques can be easily and seamlessly incorporated into the inventive systems without any need to modify the content player's hardware.

Figure 8:
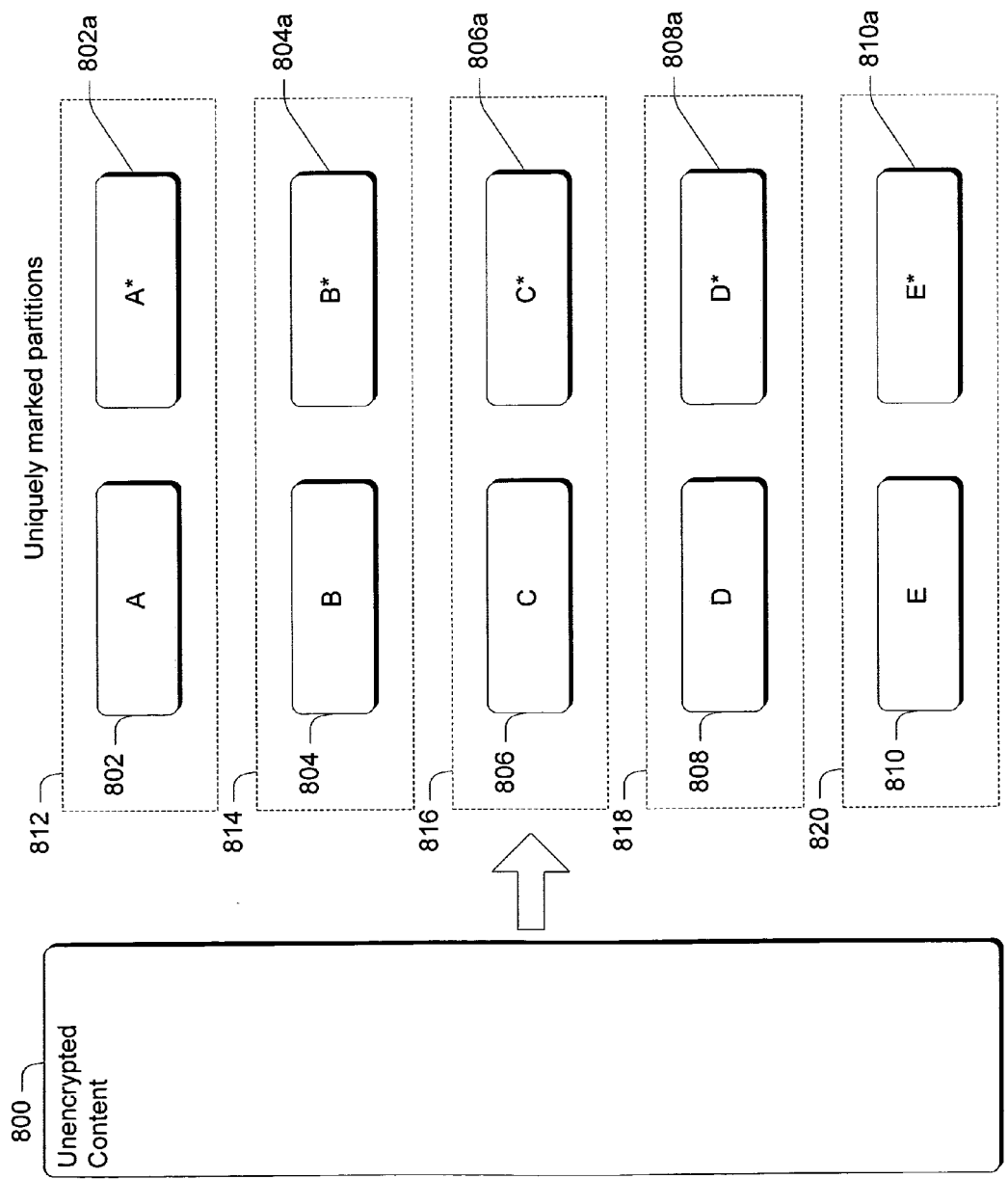
FIG. 8 is a block diagram that diagrammatically depicts exemplary processing steps in accordance with one described embodiment.

In the discussion that follows, any suitable fingerprinting (or watermarking) method can be used. Such methods will be understood by those of skill in the art. FIG. 8 shows unencrypted content 800 which can be any suitable unencrypted content. In the in-flight entertainment example, the unencrypted content comprises a movie.

At this point, the unencrypted content has not been placed onto the medium that will ultimately carry it to the content player. All or part of the unencrypted content is partitioned into multiple partitions. The partitioning of the content can take place over the entire content, or just a portion. For example, an entire movie can be partitioned, or separate individual partitions can be defined within the body of the movie itself. In the movie embodiment, these partitions are also termed "clips". A clip or partition should be large enough to support a fingerprint or watermark therewithin. In the illustrated example, multiple partitions corresponding to the unencrypted content 800 are shown at 802, 804, 806, 808, and 810. Once the partitions have been defined one or more copies of each partition or clip is made to define multiple corresponding partition sets. Each of the individual partitions of a partition set is then separately and uniquely marked, as by any suitable fingerprinting or watermarking technique. For example, in the illustrated figure, partition 802 has a corresponding partition 802a. Partition 802 is designated as "A" and partition 802a is designated as "A*" to indicate that the partitions are corresponding partitions that have been separately and uniquely marked with a different fingerprint or watermark. Together the individual partitions 802, 802a define a partition set 812. The same can be said of the remaining partitions. That is, each partition 804, 806, 808, and 810 has a corresponding respective partition 804a, 806a, 808a, and 810a. These corresponding partitions define partition sets 814, 816, 818, and 820 respectively. Each of the partitions within a partition set is uniquely and separately marked with a different fingerprint or watermark. It will be appreciated that any portion of the partition or clip can be fingerprinted. For example, with a movie, the audio and/or video bit stream could have a fingerprint inserted therein. Flexibility is provided in that any known or subsequently developed fingerprinting or watermarking technique can be utilized.

As an aside, it will be appreciated that the definition and marking of the individual partitions need not take place in that order or as separate steps. Specifically, it is possible for the partitions to be inherently defined and marked in the very process that is used to create the unencrypted content. For example, with respect to a movie, several scenes of the movie might be filmed with two different cameras at slightly different angles. In this case, the movie scenes would comprise the partition or clip, and angular difference as between the two filmed scenes would provide a mechanism by which the scenes are uniquely marked or fingerprinted.

After the partitions are defined and uniquely marked as described above, each partition of a partition set is encrypted with a different key.

Figure 9:
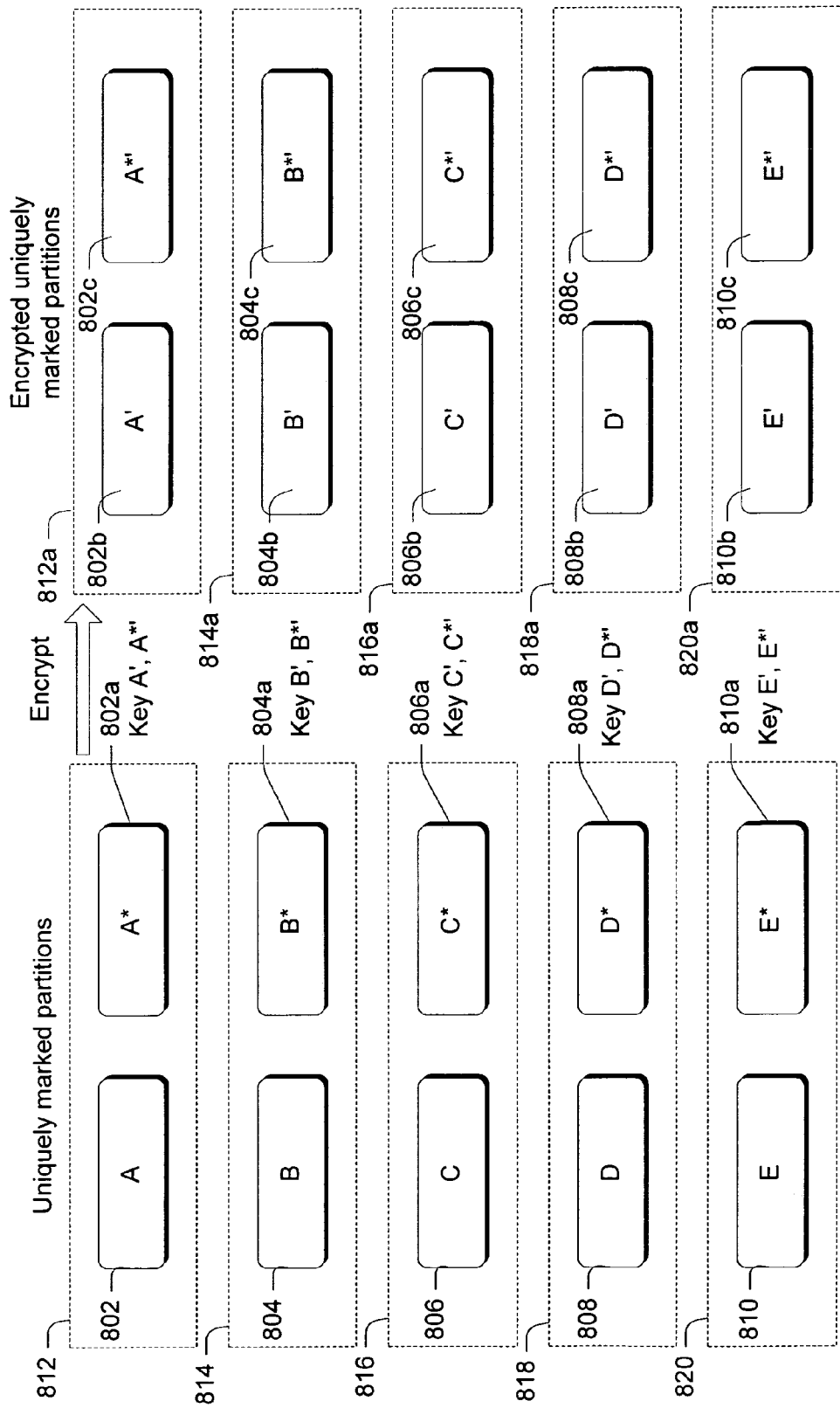
FIG. 9 is a block diagram that diagrammatically depicts exemplary processing steps in accordance with one described embodiment.

FIG. 9 shows, for example, partition sets 812–820 on the leftmost side of the figure and the resultant encrypted partition sets 812a–820a on the rightmost side of the figure. Individual different keys are associated with each of the uniquely marked partitions. For example, partitions 802, 804, 806, 808, and 810 are associated respectively with Keys A', B', C', D', and E'. These keys are utilized to encrypt the partitions to provide respective partitions 802b, 804b, 806b, 808b, and 810b of partition sets 812a–820a. Similarly, partitions 802a, 804a, 806a, 808a, and 810a are associated respectively with Keys A*', B*', C*', D*', and E*'. These keys are different from Keys A', B', C', D', and E' and are used to encrypt partitions 802a, 804a, 806a, 808a, and 810a to provide partitions 802c, 804c, 806c, 808c, and 810c of partition sets 812a–820a.

Accordingly, at this point, all of the partitions have been uniquely marked (as by suitable fingerprinting or watermarking techniques) and encrypted with different keys. Next, individual unique key collections are defined in which in any one collection there appears one and only one key for one partition or clip in each partition set. In the illustrated example, no two key collections are the same. Thus, if there are N original partitions or clips (before copying and marking takes place), each content player would receive a key collection comprising N keys. In this application, no two key collections are identical. Each key collection is then associated with a corresponding content player and encrypted with the content player's public device key. Recall that by encrypting the key collection with the content player's public device key, only the content player with the corresponding private device key can decrypt the encrypted key collection to access the encrypted content. When the content player accesses the encrypted key collection and decrypts it using their private device key, they now have the corresponding keys to decrypt the encrypted partitions or clips. When the partitions or clips are decrypted, the content player is presented with a uniquely fingerprinted version of the original digital content. For purposes of this document, a key collection for a content player can be considered as a "content key".

It will be appreciated that the encrypted content and the encrypted collection of keys for each content player can be delivered via any suitable medium. For example, the encrypted content might be delivered over a transmission medium such as the Internet, with the individual encrypted key collection for a particular player being delivered in the same manner. Alternately, the encrypted content and an encrypted key collection might be delivered commonly on the same medium. In the in-flight entertainment example, recall that one of the motivations was to provide identical DVDs for each valid content player. This means that not only does the encrypted content have to be identical, but the DVD should contain all of the encrypted key collections for each of the valid content players. Thus, if there are 50,000 valid DVD players, then there should be 50,000 encrypted collections of keys-one for each content player.

Figure 10:
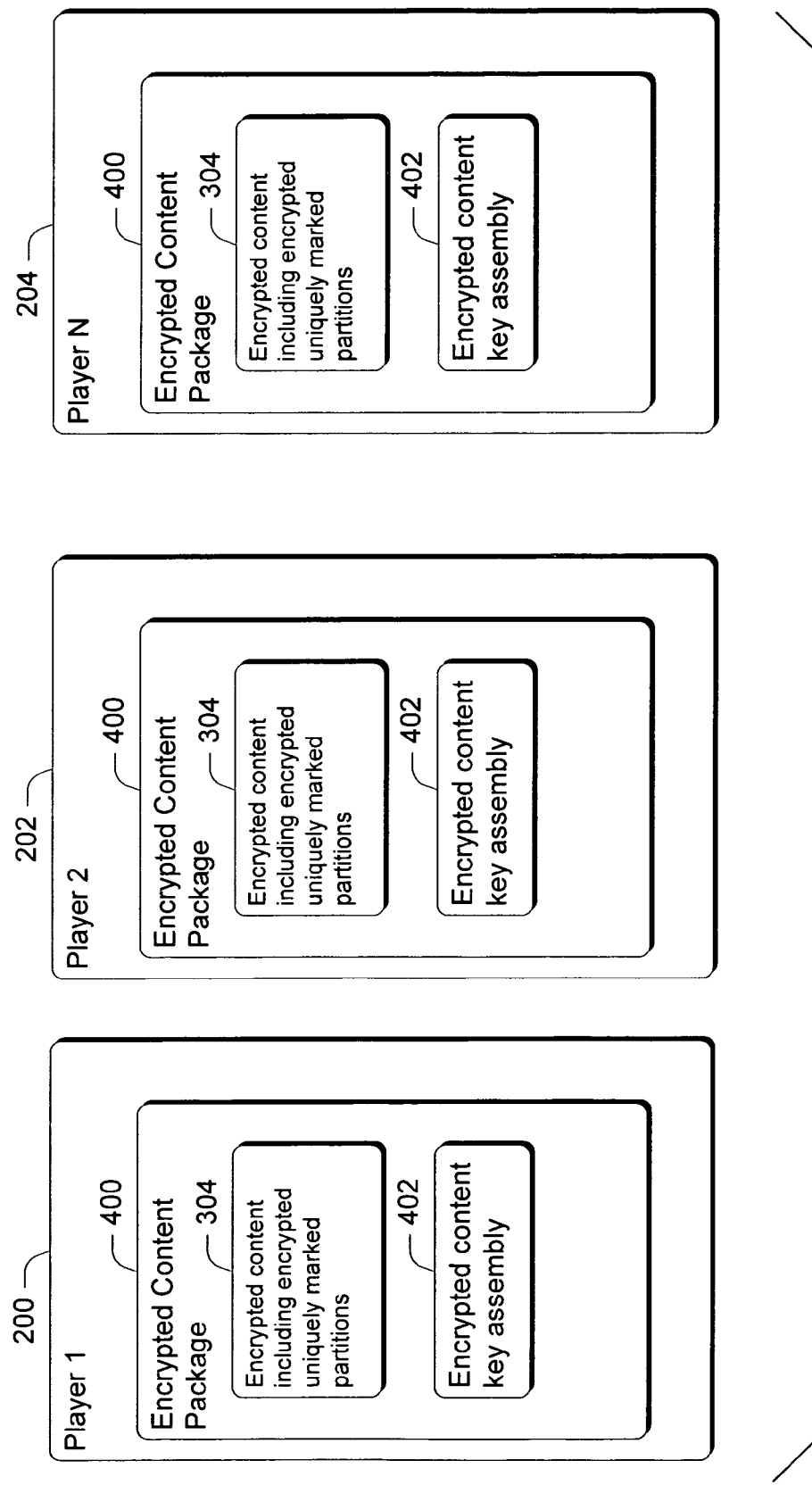
FIG. 10 is a block diagram that shows several exemplary content players in connection with one described embodiment.

FIG. 10 shows content players 200, 202, and 204. Each of the content players has been loaded with an identical DVD containing an encrypted content package 400. Each encrypted content package 400 includes the encrypted content 304 having the encrypted uniquely marked partitions or clips, as well as the encrypted content key assembly 402 containing all of the key collections that have been encrypted with each content player's public device key. (As will be discussed in greater detail, below, the encrypted content key assembly 402 actually contains one compressed key for each content player. The content player derives multiple keys, or a key collection, from the compressed key.)

Figure 11:
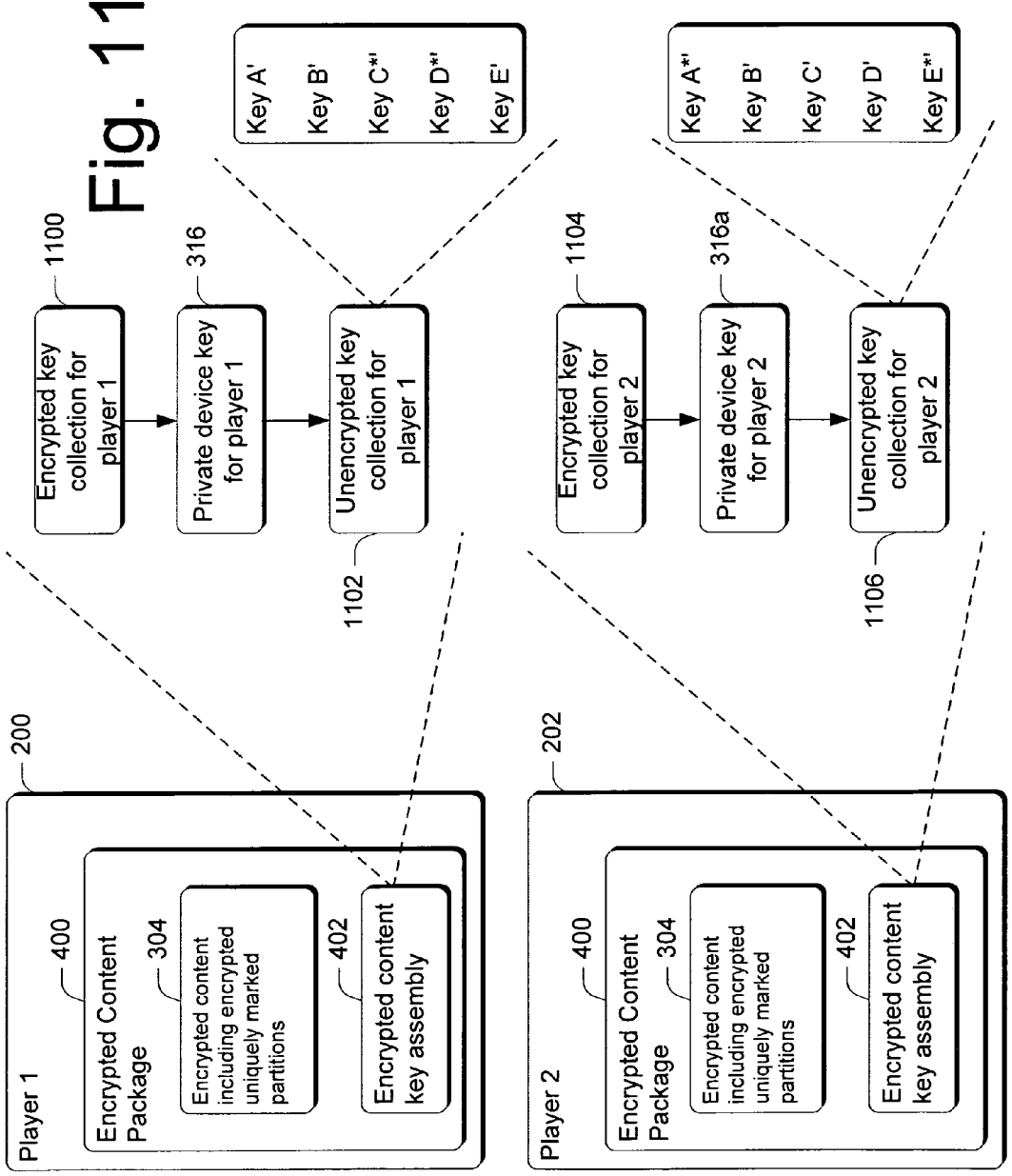
FIG. 11 is a block diagram that shows exemplary content players in connection with one described embodiment.

FIG. 11 diagrammatically illustrates the process by which the individual content players access their individual compressed keys to derive their individual encrypted key collections and decrypt them to access the keys that have been used to encrypt the individual partitions or clips. Specifically, and with reference to content player 200, the content player is programmed to access the encrypted content key assembly 402 to find their encrypted key collection 1100. Once the player locates its encrypted key collection 1100, it decrypts it using its private device key 316 to provide the unencrypted key collection 1102. In this particular example, the unencrypted key collection for player 200 comprises the following keys: A', B', C*', D*', and E'. Similarly, player 202 accesses its encrypted key collection 1104 and decrypts it using its private device key 316a to provide the unencrypted key collection

1106. In this particular example, the unencrypted key collection for player 202 comprises the following keys: A*', B', C', D', and E*'. Notice that the key collection is different for each of the content players. The same can be said of all of the content players in the universe of content players. Accordingly, no two content players have exactly the same key collection. As such, it logically follows that each content player, by virtue of using its unique key collection to decrypt the content's partitions, is presented with a slightly different version of the original digital content. Recall that each individual partition is individually differently fingerprinted or watermarked. As a result, when the partitions are decrypted by the content players, each individual version of the digital content is uniquely fingerprinted. Because the unique key collections are associated with the individual content players, if an unauthorized copy is made, its fingerprint can be ascertained and hence, from this information, the key collection that was used to decrypt the content can be ascertained. Because each content player was given a unique key collection, the precise content player from which the digital content was obtained can be ascertained.

Figure 12:
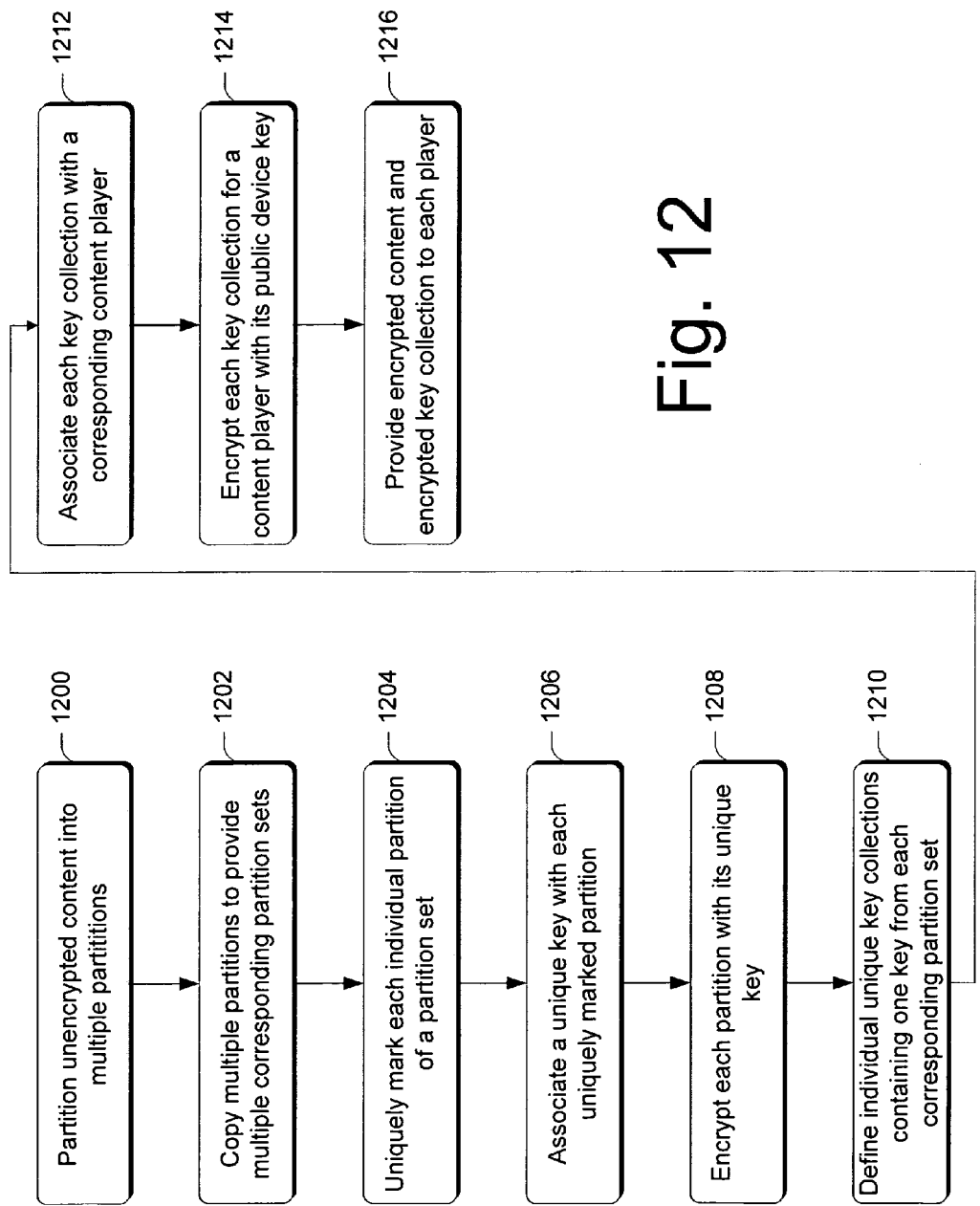
FIG. 12 is a flow diagram that describes steps in a method in accordance with the described embodiments.

FIG. 12 is a flow diagram of steps in a method in accordance with the described embodiment. The method can be implemented in any suitable hardware, computer implemented software, firmware, or combination thereof. In the illustrated example, these steps are likely to implemented by the manufacturer of a DVD or its assignees prior to distribution of its digital content. Step 1200 partitions unencrypted content into multiple partitions. This can be done by in any suitable way. For example, the unencrypted content can comprise the audio stream of a movie and suitable places to partition the audio stream can be ascertained by looking for where the stream is the least complex. Alternately the video stream can be partitioned. Step 1202 makes multiple copies of the partitions to provide multiple corresponding partition sets. Examples of partition sets are given in FIG. 8. Step 1204 uniquely marks each individual partition of a partition set. This can be accomplished using any suitable known or subsequently developed fingerprint or watermarking technique. Recall also that these steps can be implemented in a more integrated fashion as through the use of multiple camera angles in certain movie scenes. In that case, by virtue of using two different camera angles for the certain movie scenes, the unencrypted content (i.e. the entire movie) can be considered as being partitioned into partitions (step 1200) with multiple copies of the partition being made (step 1202). The multiple copies would, in this case, be provided by the different camera angles. The act of filming the movie scenes from the different camera angles would uniquely mark each individual partition.

Step 1206 associates a unique key with each uniquely marked partition. An example of this is given in FIG. 9. Step 1208 encrypts each partition with its unique key.

Step 1210 defines individual unique key collections containing one key from each corresponding partition set. The individual keys that comprise each key collection are selected so that no two key collections contain all of the same individual keys. Each of the key collections is then associated with a corresponding content player (step 1212). At this point, consider for example, one of the advantages of this system. The presently described association of unique key collections is different from other systems that have been employed in the past for the following reason. Here, the particular key collection that authorizes a content player to access the encrypted content is inextricably bound to a particular fingerprint in an index of fingerprints. In other words, there is a unique fingerprint for each version of the digital content that a content player is to play. That unique fingerprint is inextricably associated with the authorized key collection for a particular content player. By virtue of decrypting the encrypted content using its unique key collection, a content player inherently exposes a fingerprint that points directly back to that content player.

Step 1214 encrypts each key collection for a content player with its public device key. Step 1216 then provides the encrypted content and the encrypted key collection to each content player. This step can be implemented by first providing the encrypted content and then second providing the encrypted key collection. That is, the provision of the encrypted content and key collection need not take place at the same time. For example, an encrypted key collection might be provided to a content player such as a set-top box. Subsequently, encrypted content can be delivered to the set-top box and decrypted using the individual keys of the key collection. Delivery of the encrypted content and key collection can take place via different delivery media. For example, the encrypted content might be delivered via the Internet, while the encrypted key collection resides on a smart card or the like. In other embodiments, both can be delivered together on the same media. For example, a DVD might carry both an encrypted movie as well as an encrypted key collection for the content player. Additionally, in the in-flight entertainment example given above, we see how it is possible for the encrypted content and multiple differently encrypted key collections to be delivered together.

Figure 13:
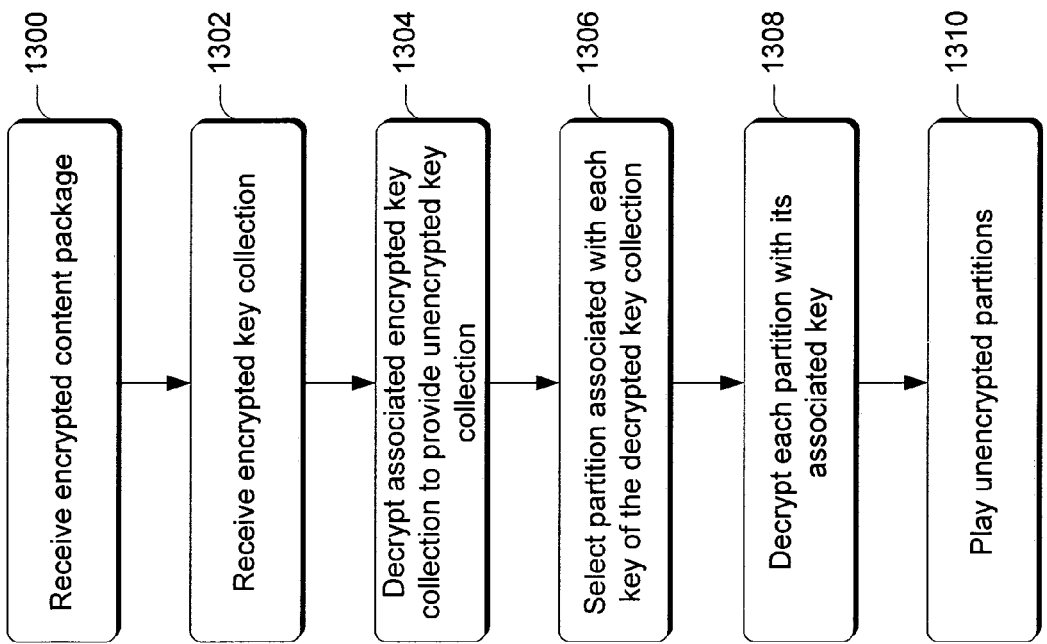
FIG. 13 is a flow diagram that describes steps in a method in accordance with the described embodiments.

FIG. 13 is a flow diagram that describes steps in a method for receiving and playing encrypted content in accordance with the described embodiment. This method can be implemented by suitably programmed content players. As mentioned above, any suitable content players can be utilized in connection with any suitable encrypted content. In a specific example, the content player comprises a DVD player.

Step 1300 receives encrypted content. The encrypted content can be received via any suitable content-carrying medium. One exemplary and non-limiting example of such a medium is a DVD. The encrypted content contains different encrypted versions of the original digital content. In the examples given above, these different versions are embodied in multiple partitions or clips that are separately marked and encrypted with different keys. Step 1302 receives an encrypted key collection that contains individual keys that can be utilized to decrypt selected partitions of the encrypted content that is received. The encrypted key collection can be received via any suitable medium. Such medium can be the same as or different from the medium that is used to deliver the encrypted content. Additionally, receipt of the encrypted key collection can take place either contemporaneously with, or at a time that is different from when the encrypted content is received. Step 1304 decrypts the associated encrypted key collection to provide an unencrypted key collection. In the example above, this is done by the player using its private device key (with the key collection having been encrypted with the player's public device key). In embodiments where multiple encrypted key collections are provided to a content player, as in the in-flight entertainment example, the player would first ascertain its specific encrypted key collection from the assembly of key collections it received and then decrypt it. Step 1306 then selects a partition that is associated with each key of the decrypted key collection and step 1309 decrypts each selected partition using the associated key. Step 1310 then plays the decrypted partitions.

"Compressing" THE Encrypted Content Keys Into a Single Key

Although the implementations described above work well to solve the identified problems, another problem may arise in the use of such methods if the number of keys provided to each content player is significantly large. For example, to prevent certain kinds of collusion attacks, it may be desirable to provide a thousand or more distinct content keys. If the number of content players and the number of content keys per player are large, then depending on the medium on which the content and keys are situated, the total number of content keys may become prohibitively large. If, however, each content player requires only a single key, then the number of content keys on the medium may be reduced by a factor of a thousand or more.

Figure 14:
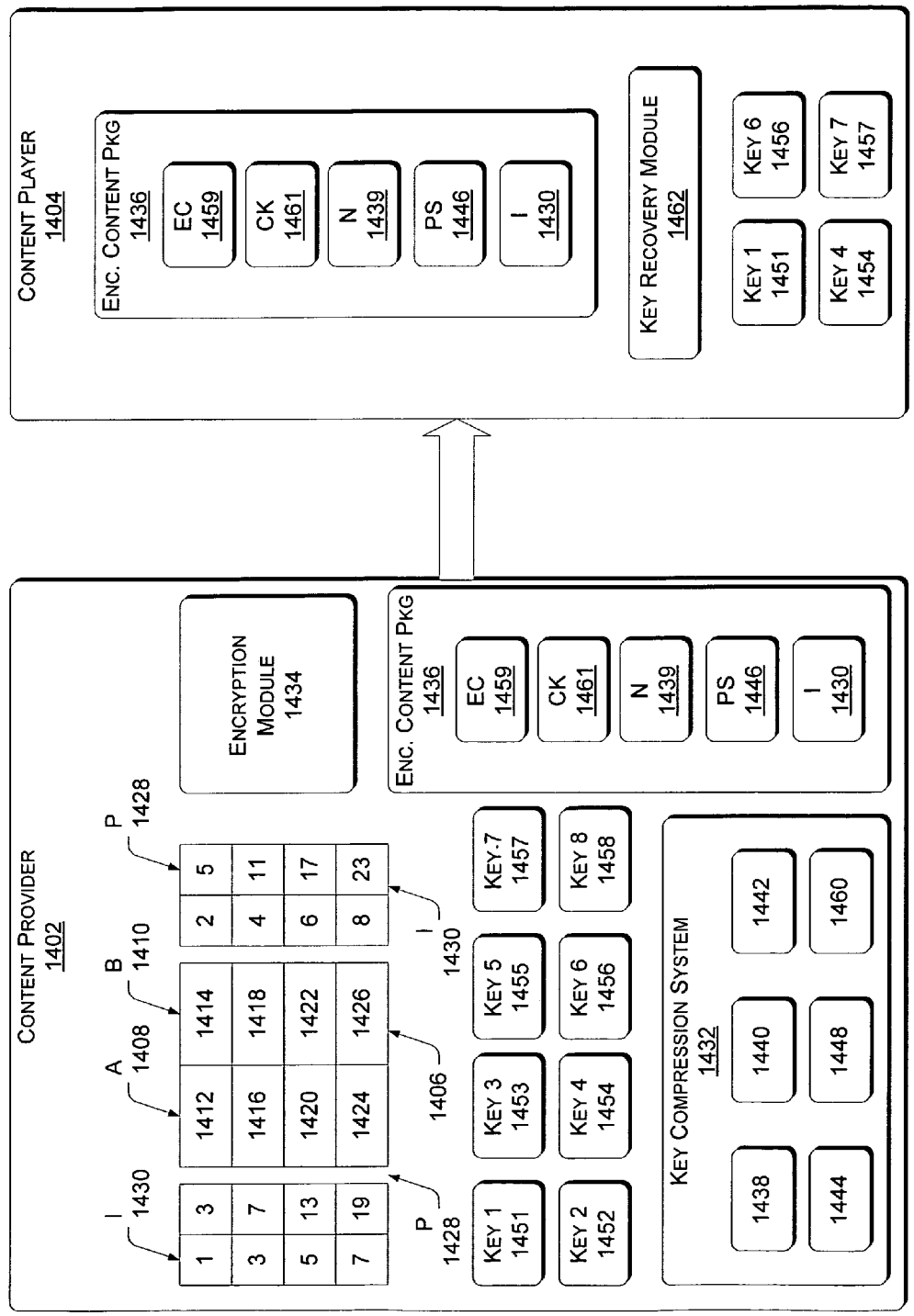
FIG. 14 is a block diagram of a content provider/content player system which utilizes the present invention.

FIG. 14 is a block diagram that depicts a provider/player system 1400 that includes a content provider 1402 and a content player 1404. The system 1400 includes a digital database 1406 comprising unencrypted content. The database 1406 is shown having a first version of a movie 1408 and a second version of a movie 1410. The first version of the movie 1408 differs from the second version of the movie 1410 in some slight way so that the first version of the movie 1408 can be distinguished from the second version of the movie 1410, as previously described.

In the present example, the database 1406 is logically divided into eight (8) segments 1412–1426. The first version of the movie 1408 comprises segment 1412, segment 1416, segment 1420 and segment 1424. The second version of the movie 1410 comprises segment 1414, segment 1418, segment 1422 and segment 1426. The segments 1412–1426 may be mixed to create a mixed version of the movie. For example, a movie may consist of segment 1412, segment 1418, segment 1422 and segment 1426. Although there are eight total segments, but only four segments are needed to view the entire movie. In this example, there are sixteen ($2^4$) combinations of segments that will render a complete movie. If, for example, the movie were divided into 10 segments, there would be 1,024 ($2^{10}$) possible mixed versions. If there were three versions of the movie divided into four segments, then there would be 81 mixed movies ($3^4$), and so on. The segmentation of the movies and the number of movie version is irrelevant to the inventive principles described herein.

A prime set 1428 is created that contains prime numbers, each prime number corresponding to one segment 1412–1426. Although any prime numbers may be used, for efficiency considerations, small prime numbers are advantageous in this method. Furthermore, the numbers corresponding to the segments do not have to be prime numbers, they may simply be ordinals, though this is less efficient than if the number are prime. However, it is noted that any reference below to a prime set may also include an ordinal set, and any reference below to a prime subset may also include an ordinal subset. The ordinal set and the ordinal subset are not necessarily prime numbers, as composite integers can also be used. Thus, the "prime set" 1428 need not actually consist of prime numbers.

The small prime numbers and their associated segments are publicly known. In FIG. 14, the prime numbers associated with the segments are:

| Segment | Prime Number |
|---------|--------------|
| 1412 | 3 |
| 1414 | 5 |
| 1416 | 7 |
| 1418 | 11 |
| 1420 | 13 |
| 1422 | 17 |
| 1424 | 19 |
| 1426 | 23 |

For convenience, an ordinal may also be assigned to each segment to create an index subset 1430. In the present example, the following indices are associated with the following segments:

| Segment | Index |
|---------|-------|
| 1412 | 1 |
| 1414 | 2 |
| 1416 | 3 |
| 1418 | 4 |
| 1420 | 5 |
| 1422 | 6 |
| 1424 | 7 |
| 1426 | 8 |

The content provider makes a determination as to which segments 1412–1426 will be selected to make up a movie for use on the content player 1402. For discussion purposes, assume that a movie, M, to be used for the content player 1402, is comprised of segment 1 (1412), segment 4 (1418), segment 6 (1422) and segment 7 (1424). A prime subset (PS) 1446 is associated with movie M, in this instance consisting of PS={3, 11, 17, 19}. The index subset 1430 that is associated with the movie M is, therefore, I={1, 4, 6, 7}.

The content provider 1402 includes a key compression system 1432, an encryption module 1434 and an encryption content package 1436 that is similar to the encryption content package 402 of FIG. 4. The key compression system 1432 includes an integer modulus generator 1438 that is configured to select two large prime integers $Q_1$ and $Q_2$ and form their product, $N=Q_1 Q_2$ (N=the integer modulus 1439). Although it is not strictly required, it is preferred that $Q_1$ and $Q_2$ each be safe primes (one greater than twice a prime). It is required that no prime number in the prime set, P, 1428 divide either ($Q_1$–1) or ($Q_2$–1). It is noted that N may comprise the product of more than two prime numbers or N may be arbitrarily selected. However, in the preferred implementation, N is the product of two large prime numbers.

A random integer generator 1440 selects a random value, x, in the multiplicative subgroup of the integers modulo N. In other words, x has no factors (greater than one) in common with N. Furthermore, the random value, x, is greater than one but less than (N–1) (1<x<N–1). A prime set derivation module 1442 derives the prime set 1428 associated with the unencrypted content (movie segments 1412–1428). A prime subset derivation module 1444 is configured to derive a prime subset 1446 that includes the prime numbers from the prime set 1428 that are associated with the data subset that comprises each instance of a movie, M.

A key encryption module 1448 is configured to derive data encryption key 1 1451, data encryption key 2 1452, data encryption key 3 1453, data encryption key 4 1454, data encryption key 5 1455, data encryption key 6 1456, data encryption key 7 1457 and data encryption key 8 1458. Instead of being chosen at random, the data encryption keys 1451–1458 are selected (pre-hash) to be the pth root modulo N of the random value, x, raised to the product of all prime numbers in the prime set 1428 (where p is the prime number in the prime set 1428 that is associated with the segment for which a key is being derived).

For example, to derive encryption key 1 1451, a value, y, is derived by raising the random value x, modulo N, to the product of all primes in the prime set 1428:

$$y = x^{\Pi P}.$$

A preliminary encryption key is thus:

$$PK_1 = y^{1/p1} \bmod N.$$

Another way to derive the preliminary encryption key without having to deal with roots, is to apply the following formula:

$$PK_1 = x^{\Pi P/p1} \bmod N,$$

where p1 is the prime number associated with data segment 1 1412. It is noted, however, that reference made herein to exponentiation also applies to taking roots of a value, since taking a root implies raising a value to a fractional exponent.

The data encryption key 1 1451 is then found by applying a fixed deterministic function (such as a hash) to the preliminary encryption key:

$$K_1 = \text{SHA-1}(PK_1).$$

No requirements are placed on this fixed deterministic function (it could even be the identity function). However, use of a cryptographic hash function such as the Secure Hash Algorithm (SHA-1) may enhance the security of the system.

The encryption key derivation module 1448 derives each of the other data encryption keys 1452–1458 in this manner. The data encryption keys 1451–1458 are then applied to the unencrypted content 1406 as previously described to derive the encrypted content 1459.

A compressed key generator 1460 generates a single, compressed key 1461 from which each of the data encryption keys in M—1451, 1454, 1456 and 1457 in this example—can be derived. The compressed key (CK) 1461 is determined by raising x modulo N, to the power of all primes that are in the prime set 1428 but not in the prime subset 1446 consisting of primes associated with keys 1451, 1454, 1456 and 1457—a complement prime set, CP:

$$CK = x^{\Pi(CP)} \bmod N.$$

Alternatively, if dealing with roots and the previously defined value, y, instead of exponents, the compressed key, CK, is derived by raising y, modulo N, to the power of all primes in the prime subset, PS:

$$CK = y^{\Pi(PS)} \bmod N.$$

The encrypted content package 1436 includes the encrypted content 1459, the compressed key 1461, the integer modulus (N) 1439, the prime subset (PS) 1446, and the index (1) 1430. The encrypted content package 1436 is provided to the content player 1404.

In an alternative implementation of the key compression subsystem 1432, the integer generator 1440 is not required to be random. In this implementation, the output of 1440 (denoted by (y)) is used by the key derivation module 1448 to generate preliminary encryption keys by applying the formula:

$$PK_1 = y^{1/p1} \bmod N.$$

The compressed key generator 1459 can then derive a compressed key by applying the formula:

$$CK = y^{1/\Pi(PS)} \bmod N.$$

A key recovery module 1462 is included in the content player 1404 and is configured to generate the data encryption keys 1451, 1454, 1456 and 1457 so that the encrypted content 1459 may be decrypted. It is noted that the key recovery module 1462 is configured to generate each data encryption key 1451–1458 that may be included in the compressed key. In the present example, however, only data encryption keys 1451, 1454, 1456 and 1457 may be recovered by the content player 1404, since these data encryption keys correspond with the data segments that make up the movie in this example, M.

To derive data encryption key 1 1451, the key recovery module 1462 raises the compressed key 1461 to the power, mod N, of the product of the prime numbers in the prime subset (PS) 1446 except for the prime number associated with the segment corresponding to the key to be recovered, in this case, segment 1 1412.

This derives a preliminary data encryption key:

$$PK_1 = CK^{\Pi P/p1} \bmod N$$

The data encryption key 1 1451 is then derived from the corresponding preliminary data encrypt key by applying the same fixed deterministic function that was applied to derive the data encryption key 1 1451:

$$K_1 = \text{SHA-1}(PK_1)$$

The remaining data encryption keys 1454, 1456 and 1457 are derived in the same manner. The data encryption keys 1451, 1454, 1456 and 1457 may then be used to decrypt the encrypted content 1459 and access the content that, in this case, is movie M.

This method may be utilized for each movie derived from segment 1 1451 through segment 8 1458. Although, in this discussion, only sixteen distinct movies may be constructed, in practical use there may be hundreds or thousands of distinct movies and, hence, compressed keys.

In one implementation, a content provider would publicly provide the encrypted content together with various parameters—such as the modulus and the list of primes—on a computer-readable medium. Many compressed keys could be provided either on the same medium or on a different medium, each compressed key allowing a user to access a subset of the encrypted content. By encrypting the compressed keys, each compressed key could be protected from use by an unauthorized user. Each user would be assigned a compressed key. If there are more compressed keys on the medium than there are users, a new user could be provided access to a data subset simply by providing the new user with the medium and the means to decrypt one of the compressed keys already on the medium.

Figure 15:
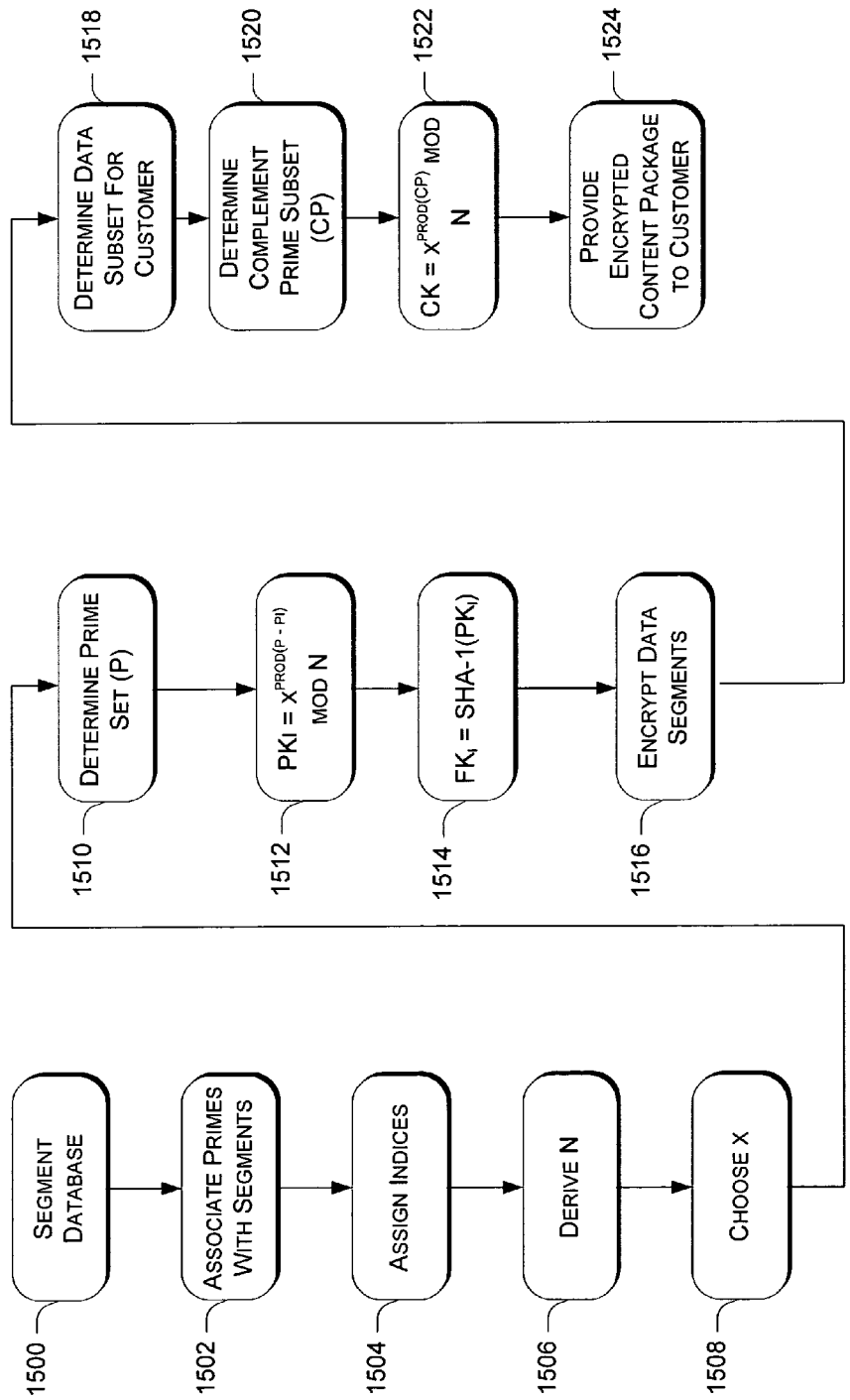
FIG. 15 is a flow diagram outlining a method for deriving multiple encryptions keys, then deriving a single key from which each of the encryption keys may be derived.

FIG. 15 is a flow diagram depicting a general method for deriving a single, compressed key from which multiple keys may be derived. The method will be described in general terms of a database owner deriving encryption keys, encrypting database data, choosing a data subset from the database data, deriving a compressed key corresponding to the data subset, and transmitting information to a customer that allows the customer to use the compressed key to access the data subset.

At step 1500 an owner of a database logically divides the database into data segments. The segmentation is arbitrary and may be as simple as letting each datum of the database comprise one data segment. A small prime number is associated with each data segment at step 1502, and ordinals are associated with each data segment to create an index at step 1504. It is noted that, although prime numbers are associated with the data segments at step 1502, composite numbers may be used in addition to—or in place of—the prime numbers. Ideally, however, prime numbers should be used.

At step 1506, the integer modulus, N, is formed as the product of two large prime numbers. It is noted that more than two prime numbers may be used in step 1506, although doing so may be less efficient. A random value, x, is then selected wherein x and N do not have any factors in common and 1<x<(N−1) (step 1508).

At step 1510, the owner determines a prime set that includes all the prime number that are associated with the database. In FIG. 14, the prime set is:

$$P=\{3, 5, 7, 11, 13, 17, 19, 23\}.$$

A preliminary key is derived for each data segment at step 1512 by raising the random value x, modulo N, to the power of the product of the prime numbers in the prime set except for the prime number associated with the data segment for which the key is being derived. For example, deriving a preliminary key for data segment 1 ($PK_1$) entails solving:

$$PK_1 = x^{\Pi(P)/pi} \mod N,$$

or $$PK_1 = x^{(5 \cdot 7 \cdot 11 \cdot 13 \cdot 17 \cdot 19 \cdot 23)} \mod N.$$

A final key for data segment 1 is derived at step 1518 by applying a fixed deterministic function, such as a cryptographic hash, to the preliminary key for data segment 1:

$$FK_1 = \text{SHA-1}(PK_1).$$

A final key is derived for each of the data segments in the database. At step 1520, the owner of the database encrypts each segment with its associated data encryption key.

At step 1522, the owner of the database determines a data subset for the customer. The data subset is denoted as a set of indices. For example, referring back to the example given with reference to FIG. 14, the data subset that is sent to the customer comprises the set I={1, 4, 6, 7}. The customer will receive the index and will understand the association between the indices and the database.

At step 1524, the owner determines a complement prime subset, CP, that includes the prime numbers of the prime set that are not associated with any data segment in the data subset to be given to the customer. In the above example, the complement prime subset comprises:

$$CP=\{5, 7, 13, 23\}.$$

At step 1522, a compressed key (CK) is generated by the owner. The compressed key is generated such that only the specified data encryption keys can be extracted from the compressed key. This is accomplished by solving:

$$CK = x^{\Pi(CP)} \mod N,$$

where CP is the complement prime set. Therefore, the equation becomes:

$$CK = x^{(5 \cdot 7 \cdot 13 \cdot 19)} \mod N.$$

At step 1524, the owner sends the encrypted data, N, the prime set, the prime subset and the index to the customer, together with the compressed key for the customer. The customer then extracts the keys that give the customer access to the data to which the customer is entitled.

Figure 16:
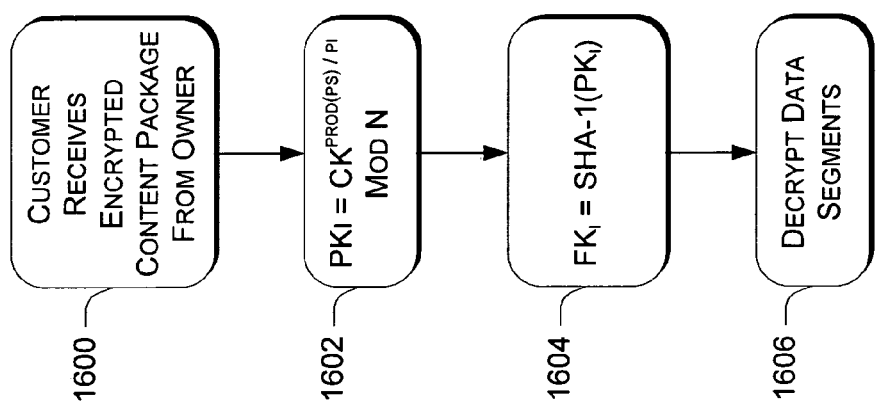
FIG. 16 is a flow diagram outlining a method for extracting each of the encryption keys from the single key.

FIG. 16 is a flow diagram depicting a general method for extracting multiple keys from a single key. At step 1600, the customer receives the encrypted content package from the owner that was sent at step 1524. The customer extracts a preliminary key for each data segment in the data subset to which the customer is entitled by raising the compressed key, modulo N, to the power of the prime numbers in the prime subset except for the prime number associated with the data segment for which a key is being extracted (step 1602). This is accomplished by solving:

$$PK_i = CK^{\Pi(PS)/pi} \mod N.$$

This is done for each data segment in the data subset. A final key is then obtained for each data segment at step 1604 by applying the same fixed deterministic function that was applied to generate the key. For example:

$$FK_i = \text{SHA-1}(PK_i).$$

The customer now has a complete set of keys (one key for each data segment in the data subset), which can be used at step 1606 to decrypt the data to which the customer is entitled.

Efficient Exponentiation Calculation

To recover a single key, $k_i$, it is apparent that a customer needs to take its compressed key set, CK and raise it, modulo N, to the power of all prime numbers, other than the prime number associated with $k_i$, in the prime subset, PS. Thus, the computational costs grow linearly with the number of data to which a customer is granted access.

However, if a customer wants to recover more than one key at a time, the amortized costs shrink rapidly. For example, a customer can compute two separate keys with only one small-prime-number modular exponentiation more than is required to compute a single key. This can easily be accomplished by raising the compressed key set, CK, to the power of all prime numbers in the prime set, P, other than the two distinguished prime numbers. This intermediate value can then be separately exponentiated by each of the two remaining primes to form the preliminary keys corresponding to the two desired keys.

In the present example, wherein there are four keys to be recovered, it can be seen that for the first key, the compressed key must be raised to the power, modulo N, of the product of the other three primes in the prime subset. Likewise, for the second key, the compressed key is raised to the power of three primes. The same is true for the third key and the fourth key. As a general rule, proceeding in this manner, (L)(L−1) exponentiations must be calculated (where L equals the number of keys to be recovered.) In this example, the number of exponentiations is twelve, or four times three. This number is not significant, but if there are one thousand keys to be recovered, there must be 999,000 exponentiations. This number is quite significant. By utilizing a tree structure as described below, the number of exponentiations can be reduced to $L \log_2 L$ small prime exponentiations. In the case of one thousand keys, this reduces the number of exponentiations from approximately one million to approximately twenty thousand, about fifty times less. It is apparent that savings on this order of magnitude are significant.

Figure 17:
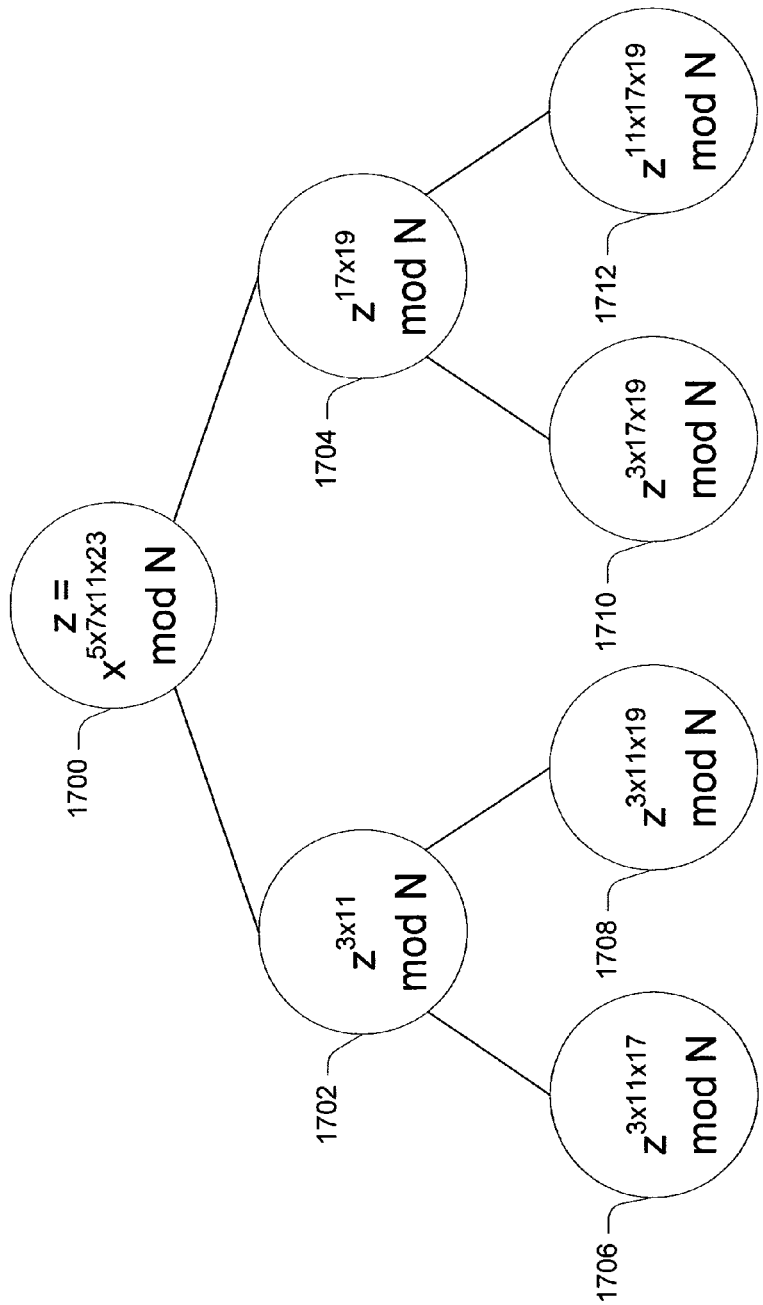
FIG. 17 depicts a tree structure that is created and used to significantly reduce the number of modular exponentiation calculations that must be performed to carry out the present invention.

FIG. 17 depicts a tree structure that can be used to reduce calculation overhead for the described implementations. In general, if M keys are to be recovered, a tree can be formed with a value at the root equal to the compressed key set raised, modulo N, to the power of all primes in the prime subset, PS, except those corresponding to the keys to be recovered.

Root node 1700 contains the compressed key, Z, which is equal to the base value x raised to the power, modulo N, of the prime numbers in the complement prime set, CP, i.e., 5, 17, 13 and 23. A balanced binary tree is now constructed by associating each of the remaining primes of the prime set (i.e., all of the primes in the prime subset) with a leaf of the tree. Each node of the tree will now contain the compressed key set, Z, raised to the power of all prime numbers in the prime set other than those associated with the leaves of its sub-tree. As a result, M modular exponentiations must be done at each of the log M levels of the tree in order to complete the tree. The values at the leaves correspond to the M newly recovered preliminary keys.

Root node 1700 has two sub-nodes, node 1702 and node 1704. Node 1702 comprises the compressed key set, Z, raised, modulo N, to the powers of 3 and 11. Node 1704 comprises the compressed key set, Z, raised, modulo N, to the powers 17 and 19. Leaf node 1706 comprises the value in node 1702 raised, modulo N, to the power of 17. Therefore, the value of leaf node 1706 is preliminary key $PK_1$. Similarly, the values in leave nodes 1708–1712 correspond to preliminary keys $PK_4$, $PK_6$ and $PK_7$, respectively.

Ideally, when recovering keys from a compressed key, a depth-first traversal is used to construct the tree. However, any practical method known in the art may be used to construct the tree structure.

As the exponential calculations are being performed, the tree is constructed. The root node 1700 represents the compressed key 1461 and the leaf nodes 1706, 1708, 1710, 1712 represent the decompressed keys 1451, 1454, 1456, 1457. The intermediate nodes 1702, 1704 are simply values that are used for deriving more than one leaf node 1706–1712.

For example, to derive leaf node 1706, the value represented by intermediate node 1702 is derived. This must be done separately for each key if the keys are derived separately. However, if key 1451 and key 1454 (leaf nodes 1706 and 1708) are both to be derived, then each of the leaf nodes 1706, 1708 can be derived from intermediate node 1706 with only one exponentiation. The same is true for intermediate node 1704 and leaf nodes 1710 and 1712. Combining the calculations saves significant resource overhead. The conceptual tree is larger and has more levels when there are more keys to be recovered. As the tree grows larger, so does the significance of the resource savings.

A tree structure as described can also be utilized to derive many compressed keys together. In this manner, the compressed keys can be derived at a lower cost than that required to derive each compressed key separately. In such an implementation, the output of the integer generator 1440 is placed at the root of the tree structure and the values at the leaves correspond to the compressed keys.

Conclusion

The embodiments described above provide improvements over past methods and systems for providing key sets having multiple keys to multiple consumers. The implementations reduce to one the number of keys distributed to a single consumer, which could be any practical number of keys, but is often times very high, such as one thousand keys or more.

In the context of a DVD player, it is desirable to distribute the same encrypted content to each unique consumer. In addition, it is desirable that each consumer's key set be included on the same disk. If the number of consumers is very high, e.g., fifty thousand, then loading fifty thousand different key sets on a DVD disk in addition to an encrypted movie can become prohibitively unwieldy if each of the key sets is itself very large. The described implementations allow distributing the encrypted content with, for example, fifty thousand single keys and a small amount of public data. This arrangement is logistically feasible.

The described implementations also disclose a method for reducing the number of calculations dramatically, making the method even more acceptable for practical use.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. One or more computer-readable media having computer-executable instructions that, when executed by a computer, perform acts for distributing a first data subset of a database to a first user and a second data subset of a database to a second user, the first user being excluded from accessing the second data subset and the second user being excluded from accessing the first data subset, the acts comprising:

logically dividing the database into multiple segments, the first user being entitled to a plurality of segments that make up the first data subset, the second user being entitled to a plurality of segments that make up the second data subset;

encrypting each segment of the database to derive an encrypted database;

deriving a first key from which the first user can derive a set of segment keys, each segment key being uniquely associated with one segment in the first data subset;

deriving a second key from which the second user can derive a set of segment keys, each segment key being uniquely associated with one segment in the second data subset;

distributing the encrypted database and the first key to the first user;

distributing the encrypted database and the second key to the second user;

deriving a first key further comprises:
  determining a first complement prime set that includes prime numbers that are not associated with any segments in the first data subset; and
  raising a random value, modulo the modulus, to a power of a product of the first complement prime set;

deriving the second key further comprises:
  determining a second complement prime set that includes prime numbers that are not associated with any segments in the second data subset; and
  raising a random value, modulo the modulus, to a power of a product of the second complement prime set; and wherein the first user can gain access to the first data subset from the first key but cannot access any segment that is not included in the first data subset, and the second user can gain access to the second data subset from the second key but cannot access any segment that is not included in the second data subset.

2. One or more media as recited in claim 1, further comprising creating an index to the database segments, the index comprising a series of ordinals, each ordinal corresponding to one segment in the database.

3. One or more media as recited in claim 1, further comprising applying a fixed deterministic function to each segment key prior to using the segment key to encrypt the segment associated with the segment key.

4. A method for decrypting a data subset of an encrypted database that is logically divided into multiple segments, each segment being encrypted with a unique segment key, the method comprising:

extracting a key set from a single key, each key in the key set being uniquely associated with one segment of the data subset of the database; and decrypting each segment of the data subset with a segment key from the key set;

wherein extracting the key set further comprises:

identifying a prime subset that includes one prime number for each segment of the data subset, one prime number being uniquely associated with one segment of the data subset;

identifying an integer modulus;

for each segment in the data subset, determining a segment key for the segment by raising the single key, modulo the modulus, to a power of a product of all primes in the prime subset except the prime number that is uniquely associated with the segment.

5. A method as recited in claim 4, wherein the segment key for each segment is a preliminary segment key, and wherein the method further comprises, for each segment, applying a fixed deterministic function to the preliminary segment key to derive the segment key.

6. A method for distributing a first data subset of a database to a first user and a second data subset of a database to a second user, the first user being excluded from accessing the second data subset and the second user being excluded from accessing the first data subset, the method comprising:

logically dividing the database into multiple segments, the first user being entitled to a plurality of segments that make up the first data subset, the second user being entitled to a plurality of segments that make up the second data subset;

encrypting each segment of the database to derive an encrypted database;

deriving a first key from which the first user can derive a set of segment keys, each segment key being uniquely associated with one segment in the first data subset;

deriving a second key from which the second user can derive a set of segment keys, each segment key being uniquely associated with one segment in the second data subset;

distributing the encrypted database and the first key to the first user;

distributing the encrypted database and the second key to the second user;

deriving a first key further comprises:

determining a first complement prime set that includes prime numbers that are not associated with any segments in the first data subset; and raising a random value, modulo the modulus, to a power of a product of the first complement prime set;

deriving the second key further comprises:

determining a second complement prime set that includes prime numbers that are not associated with any segments in the second data subset; and raising a random value, modulo the modulus, to a power of a product of the second complement prime set; and wherein the first user can gain access to the first data subset from the first key but cannot access any segment that is not included in the first data subset, and the second user can gain access to the second data subset from the second key but cannot access any segment that is not included in the second data subset.

7. A method as recited in claim 6, further comprising creating an index to the database segments, the index comprising a series of ordinals, each ordinal corresponding to one segment in the database.

8. A method as recited in claim 6, further comprising applying a fixed deterministic function to each segment key prior to using the segment key to encrypt the segment associated with the segment key.

* * * * *